(12) United States Patent
Choi et al.

(10) Patent No.: US 10,374,662 B2
(45) Date of Patent: Aug. 6, 2019

(54) WATCH-TYPE MOBILE TERMINAL

(71) Applicant: LG ELECTRONICS INC., Seoul (KR)

(72) Inventors: Jaehyun Choi, Seoul (KR); Sanghyun Jeong, Seoul (KR); Hyengcheul Choi, Seoul (KR); Sujin Kim, Seoul (KR); Sunghye Yoon, Seoul (KR); Chisang You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/756,929

(22) PCT Filed: Sep. 4, 2015

(86) PCT No.: PCT/KR2015/009383
§ 371 (c)(1),
(2) Date: Mar. 1, 2018

(87) PCT Pub. No.: WO2017/039044
PCT Pub. Date: Mar. 9, 2017

(65) Prior Publication Data
US 2018/0294844 A1 Oct. 11, 2018

(51) Int. Cl.
*G08B 1/08* (2006.01)
*H04B 5/00* (2006.01)
(Continued)

(52) U.S. Cl.
CPC .......... *H04B 5/0037* (2013.01); *G04B 37/14* (2013.01); *G06F 1/163* (2013.01); *G06F 1/1698* (2013.01); *G06F 3/015* (2013.01); *G06F 3/017* (2013.01); *G06F 3/0488* (2013.01); *G06Q 30/0623* (2013.01); *H01Q 1/2216* (2013.01); *H01Q 1/243* (2013.01); *H01Q 1/273* (2013.01);
(Continued)

(58) Field of Classification Search
CPC .................. H04B 5/0037; H04B 1/385; H04B 2001/3861; G06Q 30/0623; H01Q 1/273; G04G 21/04; G06F 3/015; G06F 3/04883
USPC ......................................... 340/539.1, 539.11
See application file for complete search history.

(56) References Cited

U.S. PATENT DOCUMENTS 6,703,935 B1 * 3/2004 Chung .................... H04L 63/12
340/572.7
7,646,305 B2 * 1/2010 Cote ................ G06K 19/07718
340/572.7
(Continued)

FOREIGN PATENT DOCUMENTS

| KR | 1020140064694 | 5/2014 |
|---|---|---|
| KR | 1020140114620 | 9/2014 |
| KR | 1020150029453 | 3/2015 |

OTHER PUBLICATIONS

PCT International Application No. PCT/KR2015/009383, International Search Report dated Jun. 13, 2016, 2 pages.

*Primary Examiner* — Zhen Y Wu
(74) *Attorney, Agent, or Firm* — Lee, Hong, Degerman, Kang & Waimey

(57) ABSTRACT

A mobile terminal comprises: a band connected to a body so as to be worn on a user's wrist; and an antenna having at least one winding such that an NFC signal for acquiring product information from a product proceeds toward a user's hand, and passing through the body and arranged along the circumference of the band.

18 Claims, 24 Drawing Sheets

(a)

(b)

(51) Int. Cl.
   *G04B 37/14*   (2006.01)
   *G06F 3/01*   (2006.01)
   *G06Q 30/06*   (2012.01)
   *H01Q 1/27*   (2006.01)
   *H04B 1/3827*   (2015.01)
   *H01Q 1/22*   (2006.01)
   *H01Q 1/24*   (2006.01)
   *H01Q 7/04*   (2006.01)
   *G06F 3/0488*   (2013.01)
   *G06F 1/16*   (2006.01)
   *G04G 21/04*   (2013.01)

(52) U.S. Cl.
   CPC .............. *H01Q 7/04* (2013.01); *H04B 1/385* (2013.01); *G04G 21/04* (2013.01); *G06F 3/04883* (2013.01); *H04B 2001/3861* (2013.01)

(56) References Cited

U.S. PATENT DOCUMENTS

| | | | | |
|---|---|---|---|---|
| 8,508,342 B2* | 8/2013 | Deguchi | | H01Q 7/00 235/375 |
| 8,674,810 B2* | 3/2014 | Uysal | | G06K 7/0008 340/10.4 |
| 8,786,441 B2* | 7/2014 | Yang | | G06K 19/07788 324/663 |
| 9,917,371 B2* | 3/2018 | Vannatta | | H01Q 11/04 |
| 2001/0052544 A1* | 12/2001 | Nishitani | | B07C 7/005 235/462.44 |
| 2006/0244606 A1* | 11/2006 | Li | | G08B 13/2417 340/572.7 |
| 2007/0268144 A1* | 11/2007 | Dobosz | | G06K 7/10386 340/572.8 |
| 2007/0279192 A1* | 12/2007 | Tanaka | | G06K 7/0008 340/10.2 |
| 2008/0024304 A1* | 1/2008 | Bergman | | G06K 7/10316 340/572.7 |
| 2009/0146819 A1* | 6/2009 | Mani | | G06K 19/07749 340/572.7 |
| 2010/0238042 A1* | 9/2010 | Paul | | G08B 13/1427 340/686.6 |
| 2010/0271187 A1* | 10/2010 | Uysal | | G06K 7/0008 340/10.4 |
| 2014/0058935 A1* | 2/2014 | Mijares | | G06Q 20/352 705/41 |
| 2014/0266624 A1* | 9/2014 | Van Bosch | | G06K 7/087 340/10.1 |
| 2015/0048689 A1* | 2/2015 | Ookawa | | H01F 38/14 307/104 |
| 2015/0223355 A1* | 8/2015 | Fleck | | G06F 1/163 361/679.03 |
| 2016/0028159 A1* | 1/2016 | Moon | | H04B 5/0075 343/749 |
| 2016/0034887 A1* | 2/2016 | Lee | | G09G 5/12 705/39 |
| 2016/0064804 A1* | 3/2016 | Kim | | H01Q 1/243 343/702 |
| 2016/0174051 A1* | 6/2016 | Yae | | H04W 4/16 455/414.1 |
| 2016/0282947 A1* | 9/2016 | Schwarz | | G06F 1/163 |
| 2017/0195009 A1* | 7/2017 | Nagai | | G06K 19/077 |
| 2017/0249544 A1* | 8/2017 | Ali | | G06K 19/0726 |
| 2018/0225701 A1* | 8/2018 | Han | | H04M 1/725 |

* cited by examiner

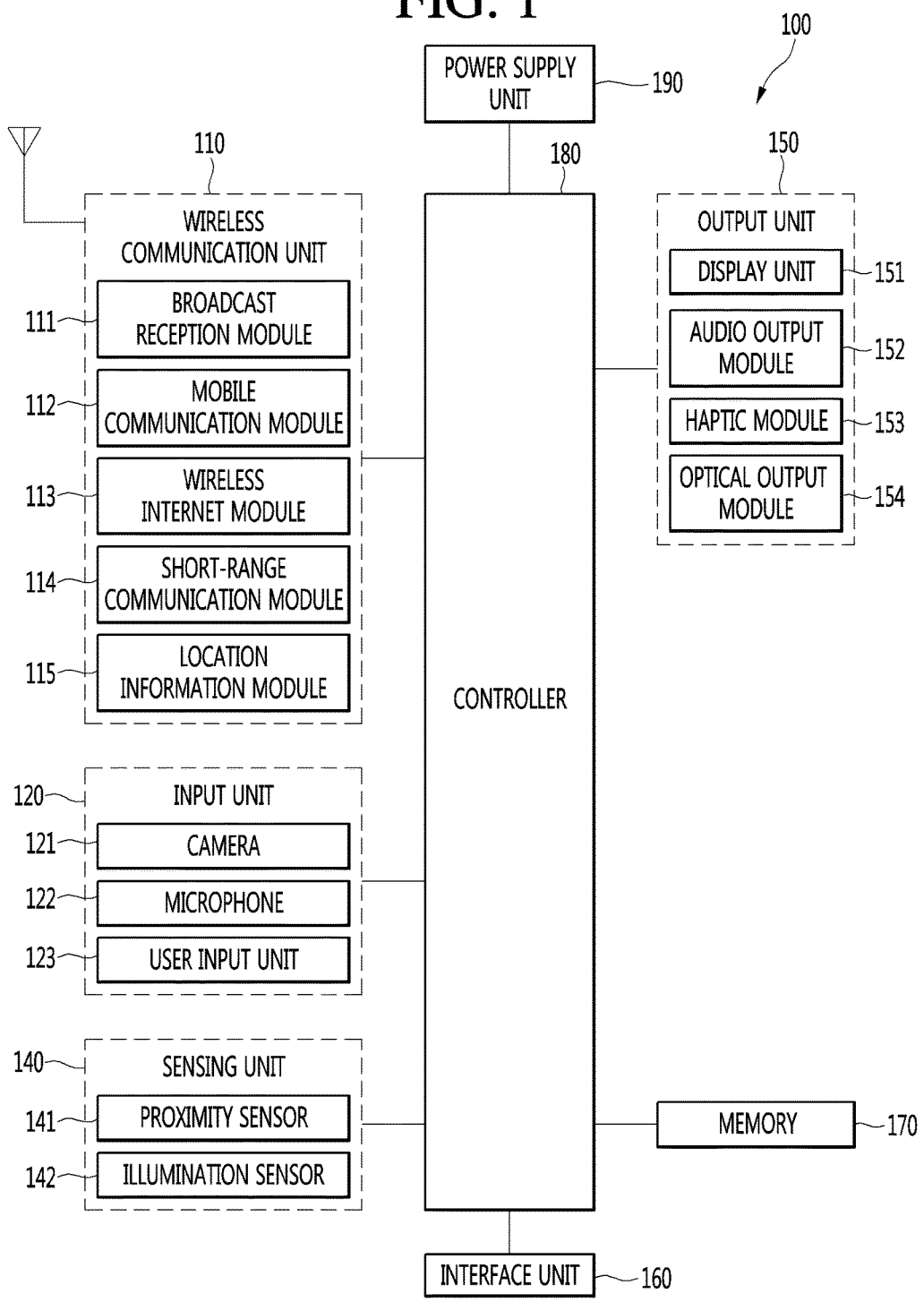

FIG. 4
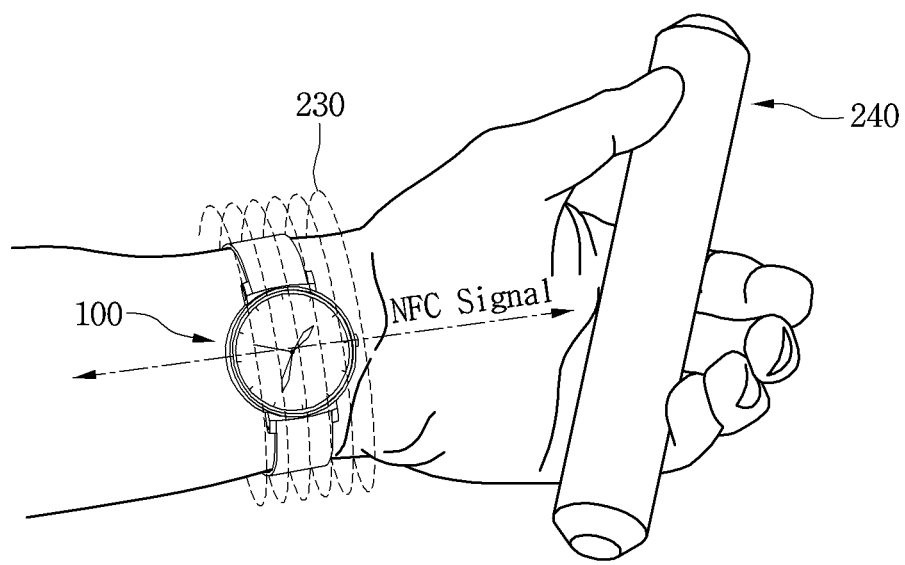
(a)
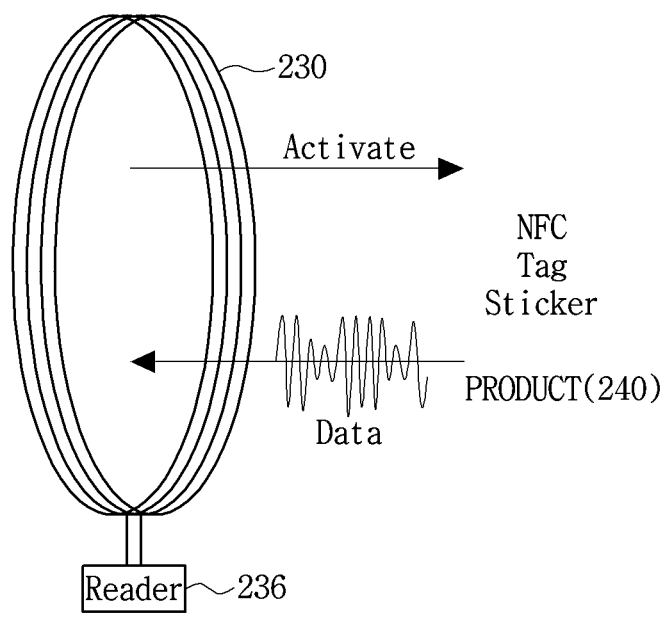
(b)

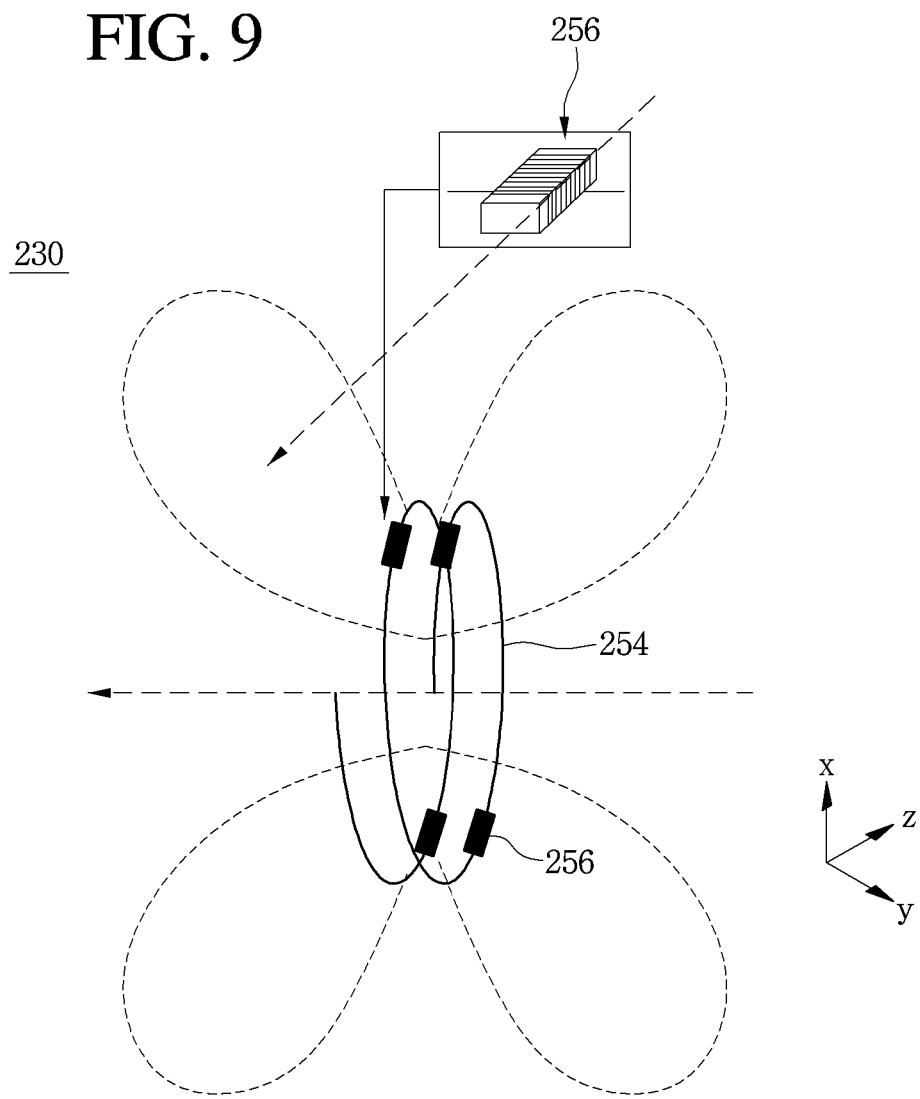

FIG. 19
CONTINUOUSLY ROTATE WRIST TWICE → ROTATE WRIST ONCE
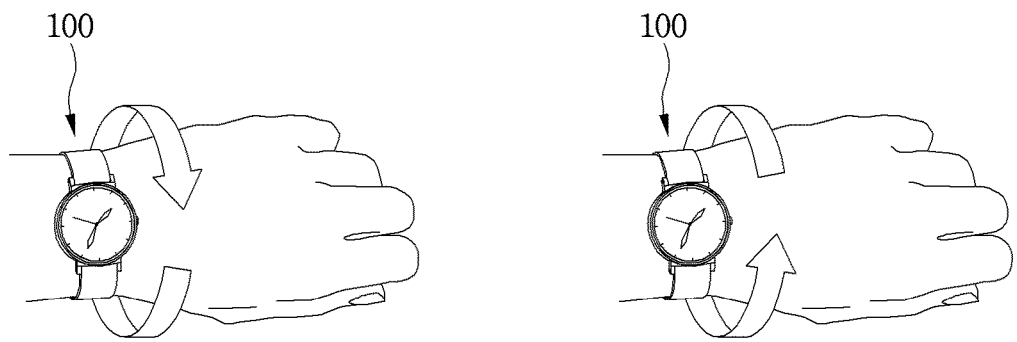
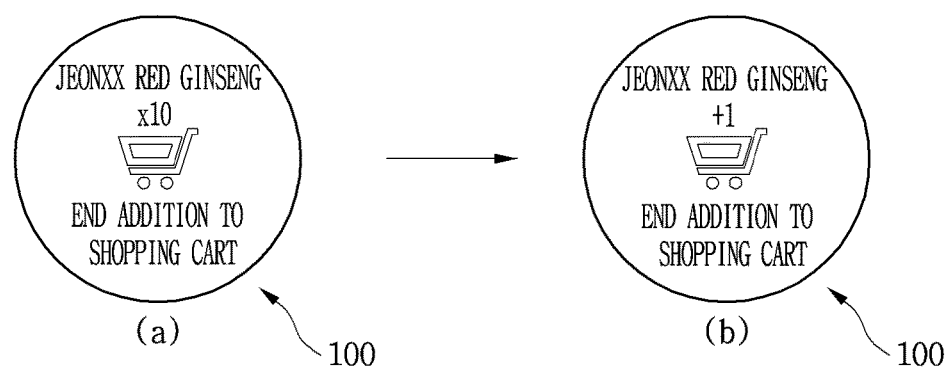
(a)          (b)

FIG. 21
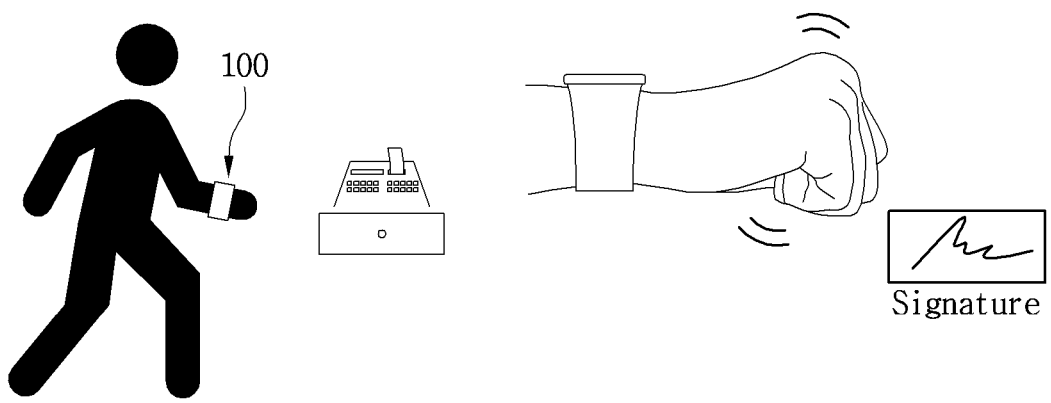
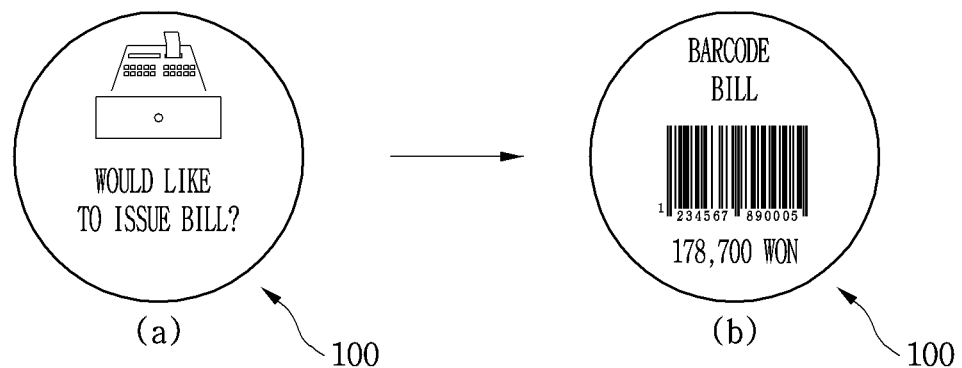

FIG. 22
DRAW SIGNATURE IN STATE
OF CLENCHING FIST
→
WATCH MANIPULATION
BARCODE BILL
Double Touch
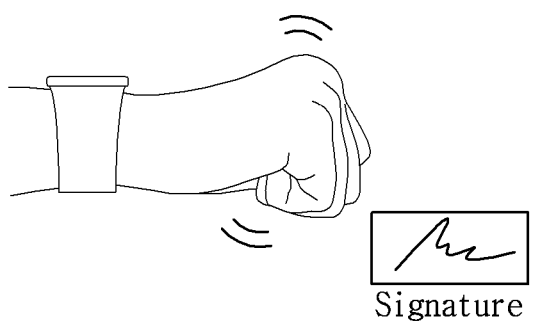
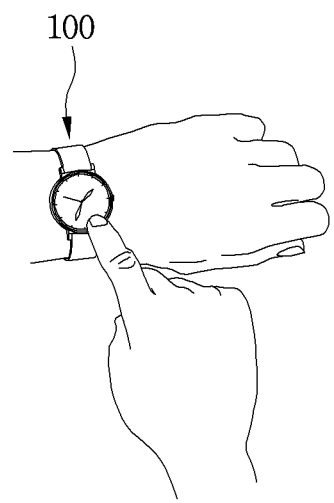

FIG. 23
ENTER COUNTER ⟶ SHAKING HAND
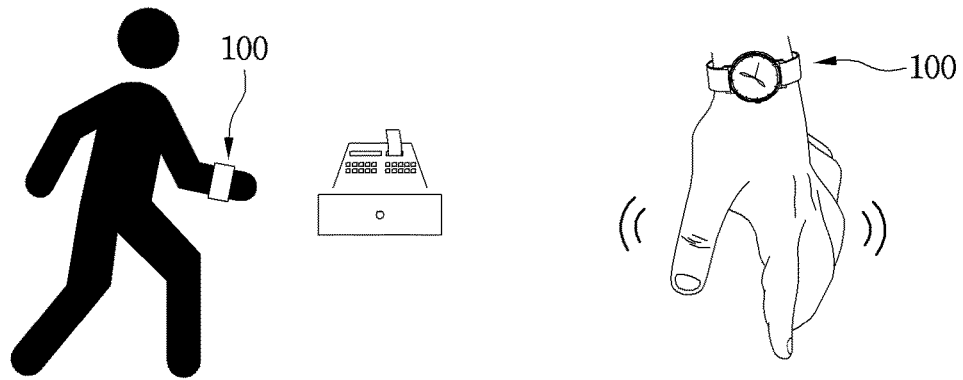
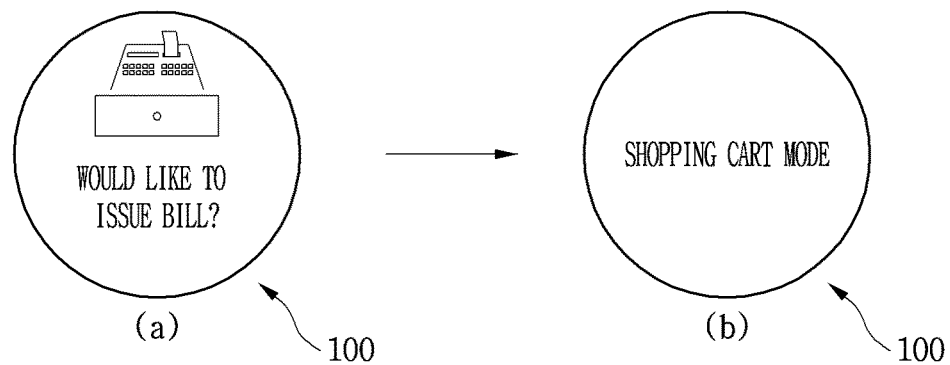

WATCH-TYPE MOBILE TERMINAL

CROSS-REFERENCE TO RELATED APPLICATIONS

This application is the National Stage filing under 35 U.S.C. 371 of International Application No. PCT/KR2015/009383, filed on Sep. 4, 2015, the contents of which are hereby incorporated by reference herein in its entirety.

TECHNICAL FIELD

The present invention relates to a watch-type mobile terminal cable of increasing user convenience.

BACKGROUND ART

Terminals may be generally classified as mobile/portable terminals or stationary terminals according to their mobility. Mobile terminals may also be classified as handheld terminals or vehicle mounted terminals according to whether or not a user may directly carry the terminal.

Users mostly hold and use the mobile terminals by their hands and furthermore, the mobile terminals may be expanded to wearable devices which may be worn on their bodies. The wearable devices include a watch-type mobile terminal, a glass-type mobile terminal, a head mounted display (HMD), and so on.

Among others, the watch-type mobile terminal is formed by the adding of electronic, communication and multimedia functions to a watch which a human being always wear, and it seems that a big market is formed in the future because the watch-type mobile terminal does not provide antipathy to the human being.

Thus, research, development and commercialization of the watch-type mobile terminal are being actively conducted.

Recently, research into applying a watch-type mobile terminal to a payment processing field has been actively conducted.

However, in the payment processing field of the watch-type mobile terminal, research into user experience (UX) capable of conveniently and easily being used by a user is insufficient.

DISCLOSURE

Technical Problem

An object of the present invention is to solve the above-described problems and other problems.

Another object of the present invention is to provide a watch-type mobile terminal capable of increasing user convenience.

Technical Solution

The object of the present invention can be achieved by providing a watch-type mobile terminal including a main body, a band connected to the main body and configured to be worn on a user's wrist, and an antenna having at least one turn such that an NFC signal for acquiring product information from a product proceeds toward a user's hand, and arranged along a circumference of the band through the main body.

Advantageous Effects

The effects of the mobile terminal according to the present invention are as follows.

According to at least one of the embodiments of the present invention, since the antenna is arranged along the circumference of the band through the main body, it is possible to easily detect product information from a product by holding the product in a user's hand.

According to at least one of the embodiments of the present invention, by changing the layout of the antenna such that an H-field intensively progresses in a specific direction, it is possible to improve readability of product information.

According to at least one of the embodiments of the present invention, if the first and second bands, in which the antennas are disposed, are separated from each other, it is possible to easily connect the antenna of the first band and the antenna of the second band to each other through various fastening structures of the first and second bands.

According to at least one of the embodiments of the present invention, since the product information of the product is acquired and added to the shopping cart list and payment for the products added to the shopping cart list is made for at a time. Therefore, since the user only pays for the products, the user does not need to put products to be purchased into a cart in a store. In addition, since payment is made at a time, payment is convenient.

According to at least one of the embodiments of the present invention, the user can immediately pay for a specific product at a place where the specific product is located when information on the specific information is displayed on the touchscreen, without adding a product to be purchased to the shopping cart list. Therefore, the user does not need to go to the counter of the store in order to pay for the specific product.

DESCRIPTION OF DRAWINGS

FIG. 1 is a block diagram illustrating a mobile terminal related to the present invention.

FIG. 4 is a diagram showing NFC communication according to an antenna structure of the present invention.

FIG. 9 is a diagram showing the structure of an antenna according to a third embodiment of the present invention.

FIG. 19 is a diagram showing an example of a screen for explaining a method of minimizing the number of gestures of a user even when a large number of same products is added to a shopping cart list.

FIG. 21 is a diagram showing an example of a screen for showing a state of processing payment at a counter.

FIG. 22 is a diagram showing an example of a screen for displaying a method of switching to a shopping cart editing mode immediately before payment.

FIG. 23 is a diagram showing an example of a screen for displaying a method of deleting a product included in a shopping cart list before payment at a store counter.

BEST MODE

Figure 2A:
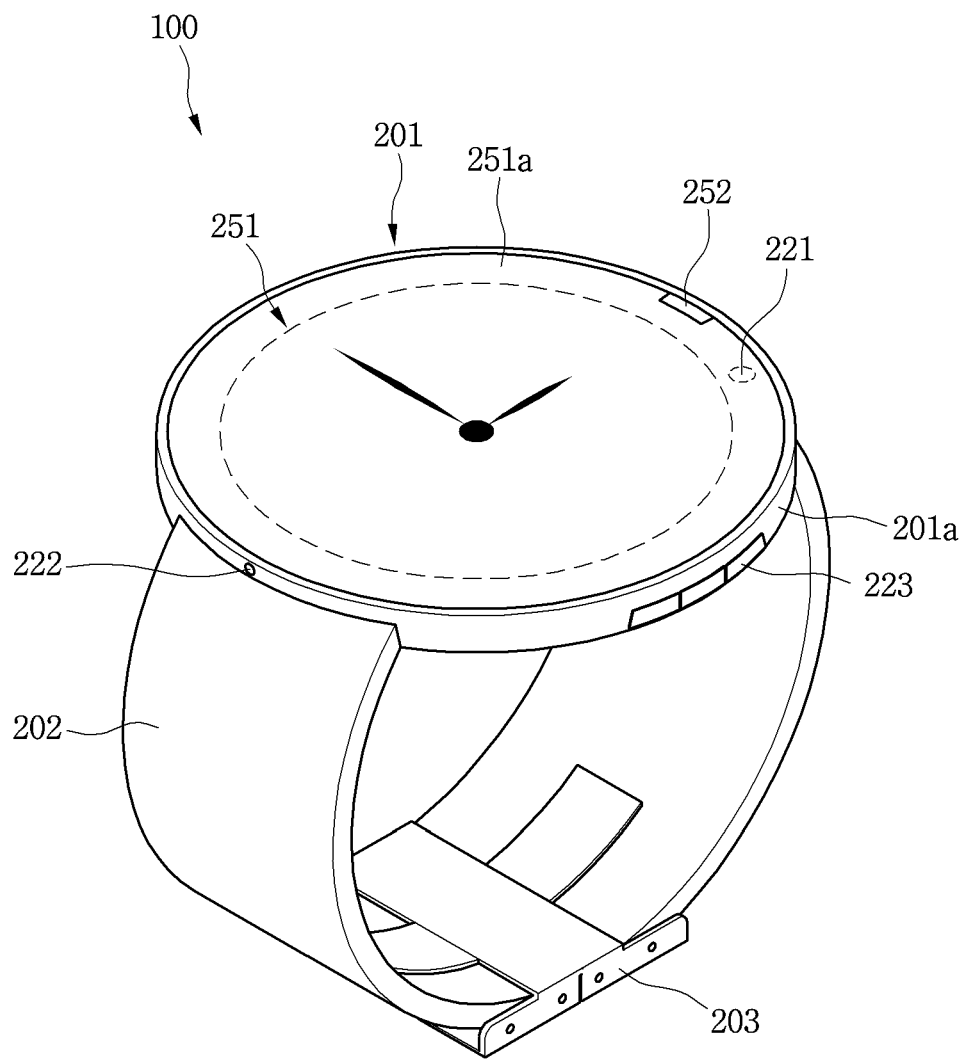
FIG. 2a is a perspective view illustrating one example of a watch-type mobile terminal related to the present invention.

Hereinafter, embodiments are described in more detail with reference to accompanying drawings and regardless of the drawings symbols, same or similar components are assigned with the same reference numerals and thus repetitive for those are omitted. Since the suffixes "module" and "unit" for components used in the following description are given and interchanged for easiness in making the present disclosure, they do not have distinct meanings or functions. In the following description, detailed descriptions of well-known functions or constructions will be omitted because they would obscure the present invention in unnecessary detail. Also, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

FIG. 1 is a block diagram for explaining a mobile terminal related to an embodiment.

A watch-type mobile terminal 100 may include a wireless communication unit 110, an input unit 120, a sensing unit 140, an output unit 150, an interface unit 160, a memory 170, a control unit 180, and a power supply unit 190. In implementing the watch-type mobile terminal, components shown in FIG. 1 are not necessary, so the watch-type mobile terminal described in this specification may include more or less components than those listed above.

The wireless communication unit 110 includes one or more of a broadcast receiving module 111, a mobile communication module 112, a wireless Internet module 113, a short-range communication module 114, and a location information module 115.

The broadcast receiving module 111 may mean a server for generating and transmitting a broadcast signal and/or broadcast related information or a server for receiving and transmitting a pre-generated broadcast signal and/or broadcast related information to a terminal. The broadcast signal may include not only a TV broadcast signal, a radio broadcast signal and a data broadcast signal but also a broadcast signal obtained by combining the TV broadcast signal or the radio broadcast signal and the data broadcast signal.

The mobile communication module 112 can transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like.

The wireless Internet module 113 is configured to facilitate wireless Internet access and may be mounted inside or outside the watch-type mobile terminal 100. The wireless Internet module 113 may transmit and/or receive wireless signals via communication networks according to wireless Internet technologies.

The short-range communication module 114 is configured to facilitate short-range communication and to support short-range communication using Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

An NFC module used for NFC communication supports non-contact type short-range wireless communication between terminals at a distance of about several tens of cm. The NFC module may operate in any one of a card mode, a reader mode and a P2P mode. In order to operate the NFC module in the card mode, the watch-type mobile terminal 100 may further include a security module for storing card information. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the watch-type mobile terminal 100. Single Wire Protocol (SWP)-based data exchange may be performed between the NFC module and the security module.

In a case where the NFC module operates in a card mode, the watch-type mobile terminal 100 may transmit card information on a general IC card to the outside. More specifically, if a watch-type mobile terminal 100 having card information on a payment card (e. g, a credit card or a bus card) approaches a card reader, a short-range mobile payment may be executed. As another example, if a watch-type mobile terminal 100 which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the watch-type mobile terminal 100 can read data from an external tag. The data received from the external tag by the watch-type mobile terminal 100 may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is of a smart poster type, the control unit 180 may execute a browser (e.g., Internet browser). If the data received from the external tag is of a text type, the control unit 180 may execute a text viewer. If the data received from the external tag is of a URI type, the control unit 180 may execute a browser or originate a call. If the data received from the external tag is of a general control type, the control unit 180 may execute a proper operation according to control content.

When the NFC module operates in a P2P (Peer-to-Peer) mode, the watch-type mobile terminal 100 can execute P2P communication with another mobile terminal. In this case, Logical Link Control Protocol (LLCP) may be applied to the P2P communication. For P2P communication, connection may be established between the watch-type mobile terminal 100 and another mobile terminal. This connection may be categorized as a connectionless mode which ends after one packet is exchanged, and a connection-oriented mode in which packets are exchanged consecutively. For a typical P2P communication, data such as an electronic type name card, address information, a digital photo and a URL, a setup parameter for Bluetooth connection, Wi-Fi connection, etc. may be exchanged. The P2P mode can be effectively utilized in exchanging data of a small capacity, because an available distance for NFC communication is relatively short.

The location information module 115 is generally configured to acquire the position (or the current position) of the watch-type mobile terminal 100. As an example, the location information module 115 includes a Global Position System (GPS) module or a Wi-Fi module.

The input unit 120 may include a camera 121 or video input unit for inputting a video signal, a microphone 122 or audio input unit for inputting an audio signal, and a user input unit 123 (e.g., a touch key, a push key (mechanical key), etc.) for receiving information from a user. Audio or video data collected by the input unit 120 may be analyzed and processed as a control command of a user.

The camera 121 processes image frames of still pictures or video obtained by image sensors in a video call more or an image capture mode. The processed image frames can be displayed on the display unit 151 or stored in memory 170.

The microphone 122 processes an external acoustic signal into electrical audio data. The processed audio data may be variously used according to function (application program) executed in the watch-type mobile terminal 100.

The user input unit 123 receives information from a user. When information is received through the user input unit 123, the control unit 180 may control operation of the watch-type mobile terminal 100 in correspondence with the received information. The user input unit 123 may include one or more of a mechanical input element (for example, a mechanical key, a button located on a front and/or rear surface or a side surface of the watch-type mobile terminal 100, a dome switch, a jog wheel, a jog switch, and the like) or a touch input element.

The sensing unit 140 may include one or more sensors for sensing at least one of internal information of the watch-type mobile terminal, surrounding environment information of the watch-type mobile terminal and user information. For example, the sensing unit 140 may include at least one of a proximity sensor, an illumination sensor, a touch sensor, an electromyogram (EMG) sensor 141, an acceleration sensor 142, a magnetic sensor, a gravity sensor (G-sensor), a gyroscope sensor 143, a motion sensor, an RGB sensor, an infrared (IR) sensor, a finger scan sensor, an ultrasonic sensor, an optical sensor (e.g., a camera (see 122)), a microphone (see 122), a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The watch-type mobile terminal 100 disclosed in this specification may be configured to combine and utilize information obtained from at least two sensors of such sensors.

The EMG sensor 141 may detect an electrical signal generated by muscle cells. Various operations of the watch-type mobile terminal 100 may be performed using change in detected electrical signal.

According to the present invention, the electrical signal may be changed by pressure changed by operation for bending or spreading out the fingers of the user when the watch-type mobile terminal is worn on the user's wrist. For example, when the fingers are bent, change in electrical signal may be increased and, when strong force is applied in a state in which the fingers are bent, change in electrical signal may be further increased. In contrast, when the bent fingers are spread out, change in electrical signal may be decreased.

The short-range communication module and, more particularly, the NFC module may be activated or a product selected by the user may be added to a shopping cart according to change in detected electrical signal.

The acceleration sensor 142 detects speed increment/decrement in one direction and the gyroscope sensor 143 detects an angle of an object rotated with respect to one axis. The gesture of the watch-type mobile terminal 100 may be recognized using the acceleration sensor 142 and the gyroscope sensor 143 and various operations may be performed according to the recognized gesture. Such various operations will be described later.

The output unit 150 is typically configured to output various types of information, such as audio, video, tactile output, and the like. The output unit 150 may include at least one of a display unit 151, an audio output module 152, a haptic module 153, and an optical output module 154. The display unit 151 may have an inter-layered structure or an integrated structure with a touch sensor in order to realize a touchscreen. The touchscreen may provide an output interface between the watch-type mobile terminal 100 and a user, as well as function as the user input unit 123 which provides an input interface between the watch-type mobile terminal 100 and the user.

The display unit 151 is generally configured to output information processed in the watch-type mobile terminal 100. For example, the display unit 151 may display execution screen information of an application program executed in the watch-type mobile terminal 100 or user interface (UI) and graphic user interface (GUI) information in response to the execution screen information.

The audio output module 152 is generally configured to output audio data received from the wireless communication unit 110 or stored in the memory 170 during modes such as a call signal reception mode, a call mode, a record mode, a voice recognition mode, a broadcast reception mode, and the like. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the control unit 180.

An optical output module 154 may output a signal for indicating event generation using light of a light source of the watch-type mobile terminal 100. Examples of events generated in the watch-type mobile terminal 100 may include message reception, call signal reception, a missed call, an alarm, a schedule notice, an email reception, information reception through an application, and the like.

The interface unit 160 serves as an interface for external devices to be connected with the watch-type mobile terminal 100. The interface unit 160 may include wired or wireless headset ports, external power supply ports, wired or wireless data ports, memory card ports, ports for connecting a device having an identification module, audio input/output (I/O) ports, video I/O ports, earphone ports, or the like. When an external device is connected to the interface unit 160, the watch-type mobile terminal 100 may perform appropriate control related to the connected external device.

The memory 170 stores data supporting various functions of the watch-type mobile terminal 100. The memory 170 may store a plurality of application programs or applications executed in the watch-type mobile terminal 100 or data and commands for operation of the watch-type mobile terminal 100. At least some of such application programs may be downloaded from an external server through wireless communication. In addition, at least some of such application programs may be installed within the watch-type mobile terminal 100 at time of manufacture or shipping, for basic functions of the watch-type mobile terminal 100 (for example, receiving a call, placing a call, receiving a message, sending a message, and the like). The application programs may be stored in the memory 170, installed in the watch-type mobile terminal 100, and executed by the control unit 180 to perform an operation (or function) of the watch-type mobile terminal 100.

The control unit 180 may typically control the general operations of the watch-type mobile terminal 100 in addition to operation associated with the application program. The control unit 180 may provide or process information or functions appropriate for a user by processing signals, data, information and the like, which are input or output by the above-described components, or executing application programs stored in the memory 170.

In addition, the control unit 180 may control some or all of the components illustrated in FIG. 2, for execution of an application program stored in the memory 170. Further, the control unit 180 may operate at least two of the components included in the watch-type mobile terminal 100, for execution of the application program.

The power supply unit 190 receives external power or provides internal power and supply the appropriate power required to operate respective elements and components included in the watch-type mobile terminal 100 under control of the control unit 180. The power supply unit 190 may include a battery, which is typically rechargeable or be detachably coupled to the terminal body for charging.

At least some of the components may operate in cooperation with each other in order to implement the method of operating or controlling the watch-type mobile terminal 100 according to the below-described various embodiments. In addition, the method of operating or controlling the watch-type mobile terminal 100 may be implemented in the watch-type mobile terminal 100 by executing at least one application program stored in the memory 170.

Figure 2B:
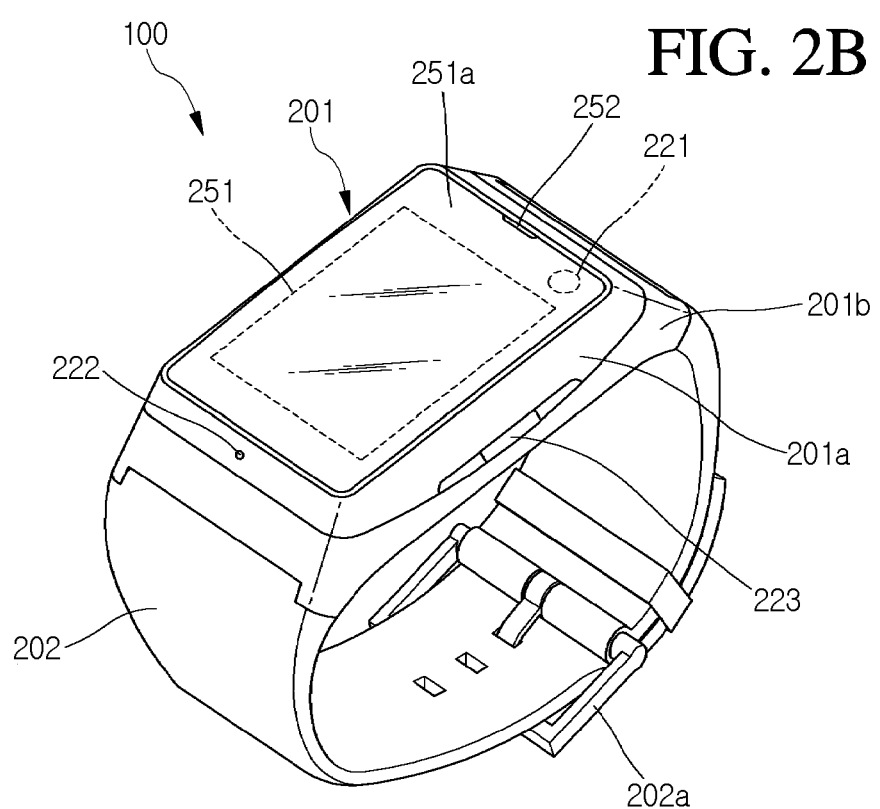
FIG. 2b is a perspective view showing another example of a watch-type mobile terminal related to the present invention.

FIG. 2a is a perspective view illustrating one example of a watch-type mobile terminal related to the present invention, and FIG. 2b is a perspective view showing another example of a watch-type mobile terminal related to the present invention.

FIGS. 2a and 2b are equal in the functions of the components except for the shape of the touchscreen 251 of the watch-type mobile terminal 100. That is, the touchscreen 251 of the watch-type mobile terminal 100 shown in FIG. 2a has a circular shape, but the touchscreen 251 of the watch-type mobile terminal 100 shown in FIG. 2b has a rectangular shape. The touchscreen 251 shown in FIG. 2a may have an elliptical shape instead of the circular shape, without being limited thereto. The touchscreen 251 shown in FIG. 2b may have a pentagonal shape or a hexagonal shape instead of the rectangular shape, without being limited thereto.

Any shape capable of providing a visually good image to the user and aiding the user in manipulating the touchscreen 251 may be used as the shape of the touchscreen 251 of the present invention.

Referring to FIGS. 2a and 2b, the watch-type mobile terminal 100 includes a main body 201 including a touchscreen 251 and a band 202 connected to the main body 201 to be worn on a user's wrist.

The main body 201 includes a case forming appearance of the mobile terminal. As shown in the figure, the case may include a first case 201a and a second case 201b for providing an internal space in which various electronic parts are received. The present invention is not limited thereto and one case may be configured to provide the internal space.

The touchscreen 251 may be disposed on a front surface of the main body 201 to output information and the touchscreen 251 may include a touch sensor to receive information. As shown in the figure, the window 251a of the touchscreen 251 may be mounted in the first case 201a to form the front surface of the terminal body along with the first case 201a.

The main body 201 may include a sound output unit 252, a camera 221, a microphone 222 and a user input unit 223.

The touchscreen 251 may be the display unit 151 of FIG. 1, the sound output unit 252 may be the sound output unit 152 of FIG. 1, the camera 221 may be the camera 121 of FIG. 1, and the microphone 222 may be the microphone 122 of FIG. 1.

The band 202 is worn on the wrist to surround the wrist and may be formed of a flexible material to be easily worn. As an example, the band 202 may be formed of leather, rubber, silicon, synthetic resin, metal having elastic force, etc. In addition, the band 202 may be configured to be attached to or detached from the main body 201 and may be replaced by bands having various shapes according to user preference.

The band 202 may include a fastener 203, without being limited thereto. The fastener 203 may be implemented by a buckle, a snap-fit capable hook structure, Velcro™, and the like, and may include a flexible portion or material. In this figure, the fastener 203 is implemented by a buckle.

As another example, the band 202 is integrally formed without the fastener 203. In this case, the band 202 may be formed of an elastic material and the length of the circumference of the band 202 may be equal to or less than that of the circumference of the wrist of the user. Accordingly, since the band 202 has elastic force, the band may be extended when passing through the hand of the user and may be restored to original elastic force to be fixed to the wrist of the user when being located on the wrist of the user.

Meanwhile, the watch-type mobile terminal 100 may be configured to perform short-range wireless communication and may have an antenna for short-range wireless communication. The antenna may be an NFC antenna, without being limited thereto.

Figure 3:
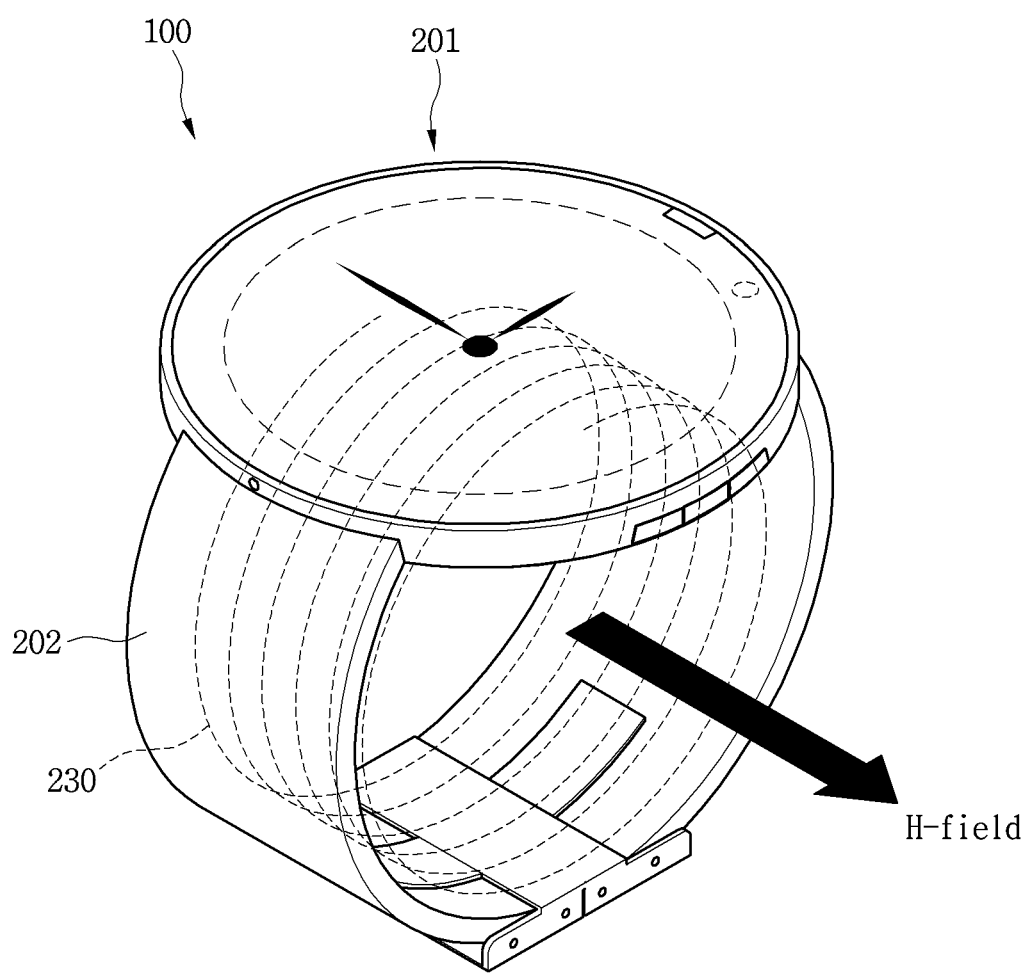
FIG. 3 is a diagram showing the layout of an antenna employed in a watch-type mobile terminal according to the present invention.

For example, the antenna 230 may have at least one turn and may be arranged along the circumference of the band through the main body 201, as shown in FIG. 3. The antenna 230 may be disposed in the band or at an inner side surface of the band, without being limited thereto.

By the antenna 230 having such arrangement, a H-field, that is, an NFC signal, may be generated and moved in a direction perpendicular to the rotation direction of the antenna 230, that is, the circumferential direction of the band. The NFC signal may have a frequency of about 13.56 MHz, without being limited thereto.

FIG. 4 is a diagram showing NFC communication according to an antenna structure of the present invention.

As shown in FIG. 4a, the NFC signal may be generated and moved in the direction perpendicular to the rotation direction of the antenna 230. By such an NFC signal, data or information included in a tag sticker of a product 240 may be read.

As shown in FIG. 4b, an NFC signal may be delivered to the tag sticker of the product 240 as an activation signal and data included in the tag sticker may be read in response to the activation signal to be sent to the watch-type mobile terminal 100.

The data received from the product 240 may be read by a reader 236 connected to the antenna 230. The reader 236 may be included in the control unit 180, without being limited thereto.

According to the present invention, since the antenna 230 is arranged to be wound along the circumferential direction of the band, if the watch-type mobile terminal 100 is worn on the wrist of the user, the progress direction of the NFC signal (H-field) generated by the antenna 230 is equal to the longitudinal direction of the arm of the user. Therefore, the NFC signal progresses to the location of the product 240 held in fingers. Accordingly, the wrist of the user does not need to be turned such that the NFC signal progresses to the product 230. When the product 240 is held in the fingers of the user, the product 240 may be located in the progress direction of the NFC signal such that the data included in the tag sticker of the product 240 may be easily acquired.

Meanwhile, if the H-field corresponding to the NFC signal is simultaneously delivered to a plurality of products, product information of the other products may be acquired in addition to the product held in the hand of the user.

In order to solve such a problem, the strength of the H-field may be adjusted. In order to adjust the strength of the H-field, power applied to the antenna may be changed. For example, if the H-field of A level is sufficiently large to be delivered to all five products and thus product information is acquired from the five products, the strength of the H-field may be reduced such that product information is acquired from only the product held in the hand of the user.

More specifically, if the product information is acquired from the five products in response to the H-field of A level such that the watch-type mobile terminal 100 receives the acquired product information, the control unit 180 may determine that errors occur in product information acquisition and adjusts the H-field of A level to H-field of B level. The H-field of B level has a strength delivered to three products and, when the H-field is delivered to three products and product information is received from the three products, the control unit 180 may determine that errors occur in product information acquisition and adjust the H-field of B level to H-field of C level. The H-field of C level has a strength delivered to one product, that is, the product held in the hand of the user, and, when the H-field is delivered to a corresponding product and product information is received from one product, the control unit 180 may determine that no error occurs in product information acquisition and display the acquired product information on the touchscreen 151.

Figure 5:
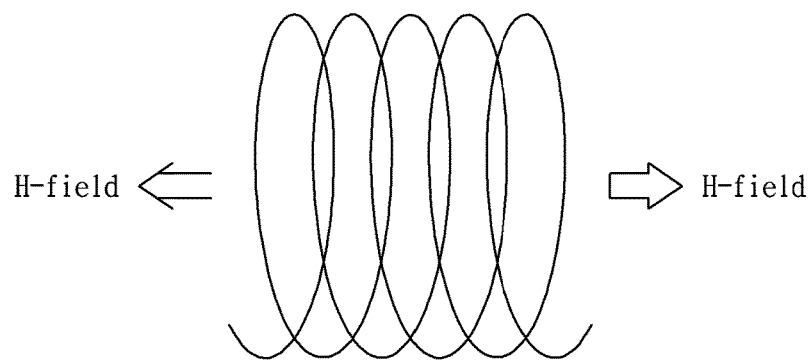
FIG. 5 is a diagram showing the structure of an antenna according to a first embodiment of the present invention.

FIG. 5 is a diagram showing the structure of an antenna according to a first embodiment of the present invention.

As shown in FIG. 5, the structure of the antenna according to the first embodiment of the present invention may include an antenna wound by a plurality of rotation turns.

The antenna 230 according to the first embodiment of the present invention may be arranged along the circumference of the band 202 through the main body 201 of the watch-type mobile terminal 100, as shown in FIG. 3.

In the structure of such an antenna 230, the H-field may progress in both directions, that is, along the left and right directions of the antenna.

Accordingly, when the watch-type mobile terminal 100, in which the structure of the antenna 230 is arranged along the circumference of the band of the watch-type mobile terminal 100, is worn on the wrist of the user, the H-field which is generated when a specific product is held in the hand of the user and is moved toward the hand of the user, that is, the NFC signal, is delivered to the specific product such that product information is read from the tag sticker of the specific product.

In the structure of such an antenna 230, another H-field is generated by the antenna 230 and moved toward the wrist of the user instead of the hand of the user and such a H-field is not used to recognize the specific product.

Figure 6:
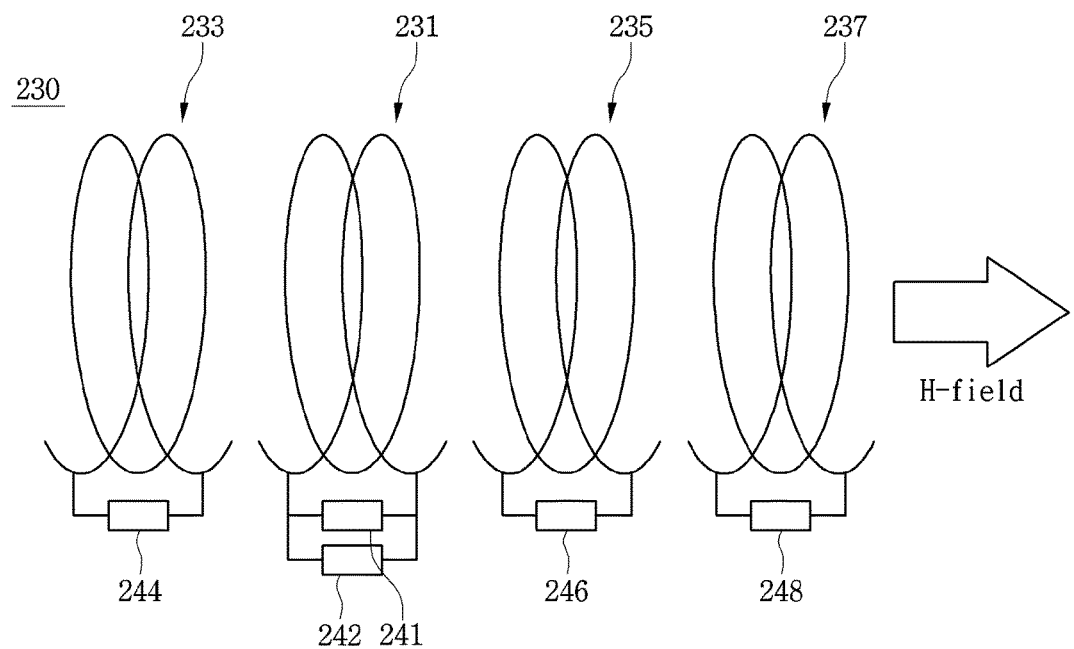
FIG. 6 is a diagram showing the structure of an antenna according to a second embodiment of the present invention.

In order to solve such a problem, an antenna structure shown in FIG. 6 is proposed.

FIG. 6 is a diagram showing the structure of an antenna according to a second embodiment of the present invention.

In the structure of the antenna 230 according to the second embodiment, the H-field intensively progress in a specific direction to deliver a stronger H-field to a specific product held in the hand of the user, thereby more easily reading information included in the specific product.

The antenna 230 according to the second embodiment may be arranged along the circumference of the band 202 through the main body 201 of the watch-type mobile terminal 100, as shown in FIG. 3.

As shown in FIG. 6, the structure of the antenna 230 according to the second embodiment of the present invention may include a feeding antenna 231, a reflecting antenna 233 and one or more directional antennas 235 and 237.

Although two directional antennas 235 and 237 are shown in the figure, two or more directional antennas may be provided.

Although one reflecting antenna 233 is shown in the figure, one or more reflecting antennas may be provided.

The feeding antenna 231 may receive power for generating the H-field and receive and send information read from the tag sticker of a product to the reader (236 of FIG. 4).

The feeding antenna 231 may have a feeding point 241 for supplying power.

The directional antennas 235 and 237 may be disposed at a first side, for example, the right side, of the feeding antenna 231 to face the feeding antenna 231. The directional antennas 235 and 237 may guide the H-field generated by the feeding antenna 231 in one direction, that is, the right direction of the feeding antenna 231 of FIG. 6, thereby improving orientation or directivity of the H-field.

As the number of directional antennas 235 and 237 is increased, the strength of the H-field is increased and directivity may be enhanced. Here, directivity may refer to a degree of suppressing dispersion of the H-field. Enhancing or increasing directivity may mean that the dispersion of the H-field is minimized such that the H-field progresses in a specific direction.

The reflecting antenna 233 may be disposed at a second side, for example, the left side, of the feeding antenna 231 to face the feeding antenna 231. The reflecting antenna 233 may reflect the H-field generated by the feeding antenna 231 and moved in the left direction of the feeding antenna 231 toward the directional antennas 235 and 237.

Reflectance of the H-field progressing in the left direction of the feeding antenna 231 may be determined according to the design of the reflecting antenna 233. If reflectance of the reflecting antenna 233 is 100%, the H-field progressing in the left direction of the feeding antenna 231 may be reflected toward the directional antennas 235 and 237.

The feeding antenna 231, the reflecting antenna 233 and the first and second directional antennas 235 and 237 may have capacitors 242, 244, 246 and 248, respectively.

For example, the capacitor 242 may be connected to one end of the feeding antenna 231 and the other end of the feeding antenna 231. For example, the capacitor 244 may be connected to one end of the reflecting antenna 233 and the other end of the reflecting antenna 233. For example, the capacitor 246 may be connected to one end of the first directional antenna 235 and the other end of the first directional antenna 235. For example, the capacitor 248 may be connected to one end of the second directional antenna 237 and the other end of the second directional antenna 237.

The capacitance values of the capacitors 242, 244, 246 and 248 may be gradually decreased from the reflecting antenna 233 to the second directional antenna 237.

For example, the capacitance value of the capacitor 242 provided in the feeding antenna 231 may be less than that of the capacitor 244 provided in the reflecting antenna 233.

The capacitance value of the capacitor 246 provided in the first directional antenna 235 may be less than that of the capacitor 242 provided in the feeding antenna 231.

The capacitance value of the capacitor 248 provided in the second directional antenna 237 may be less than that of the capacitor 246 provided in the first directional antenna 235.

The feeding antenna 231, the reflecting antenna 233 and the first and second directional antennas 235 and 237 may be spaced apart from or connected to each other, without being limited thereto.

Meanwhile, the reflecting antenna 233 may not include the capacitor 244. Instead, one end and the other end of the reflecting antenna 233 may be short-circuited. In other words, one end and the other end of the reflecting antenna 233 may be connected to each other.

Each of the feeding antenna 231, the reflecting antenna 233 and the first and second directional antennas 235 and 237 may have at least one rotation turns.

The feeding antenna 231 may include only the feeding point 241 and may not include the capacitor 242, without being limited thereto.

FIG. 7 is a diagram showing progressing of an H-Field in the antenna structure of FIG. 6.

Figure 7A:
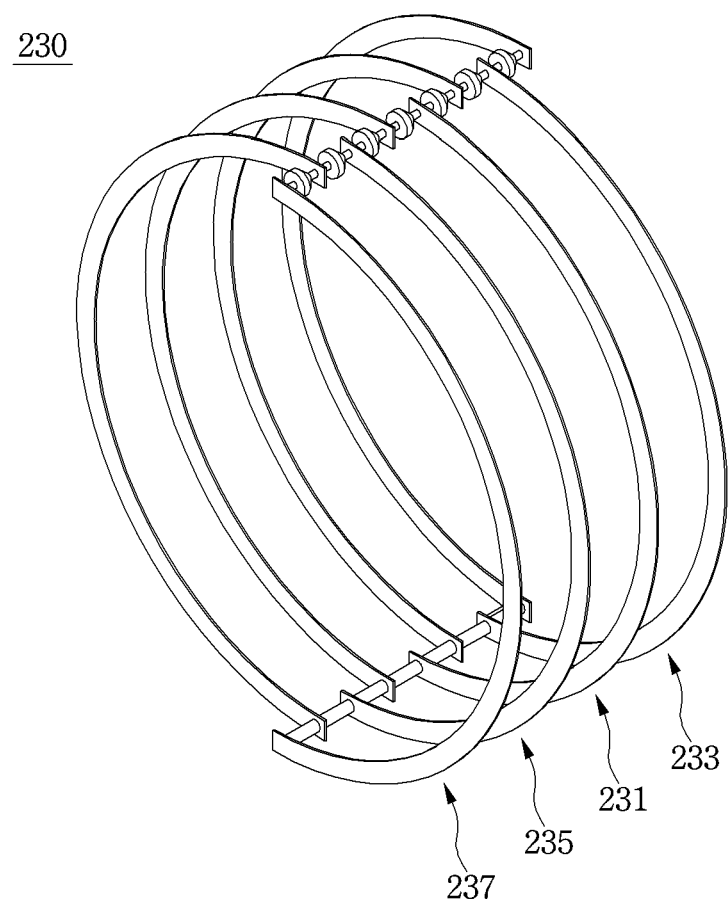
FIG. 7a is a diagram showing an example of the antenna structure of FIG. 6.

As shown in FIG. 7a, the reflecting antenna 233 may be provided at the right side of the feeding antenna and the first and second reflecting antennas 235 and 237 may be provided at the left side of the feeding antenna 231.

Figure 7B:
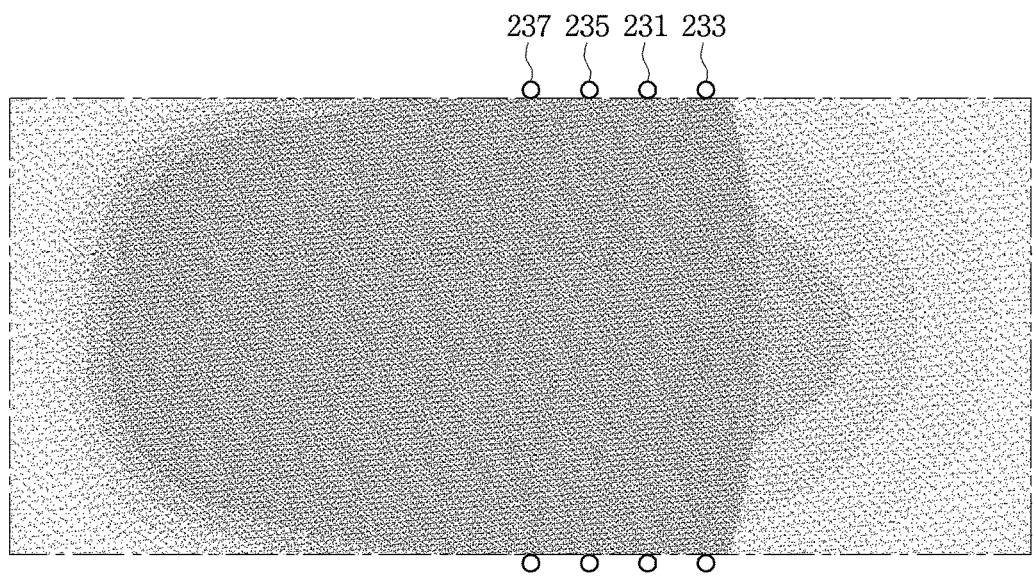
FIG. 7b is a diagram showing progressing of an H-Field in the antenna structure of FIG. 6.

When power is applied to the structure of the antenna 230, as shown in FIG. 7b, the H-field may not progress to the right side of the reflecting antenna 233 but may strongly be generated to progress to the left side of the first and second directional antennas 235 and 237. Since the H-field is strongly generated, the H-field may farther progress and have stronger influence, thereby easily reading the information from the product as compared to the prior art.

Figure 8A:
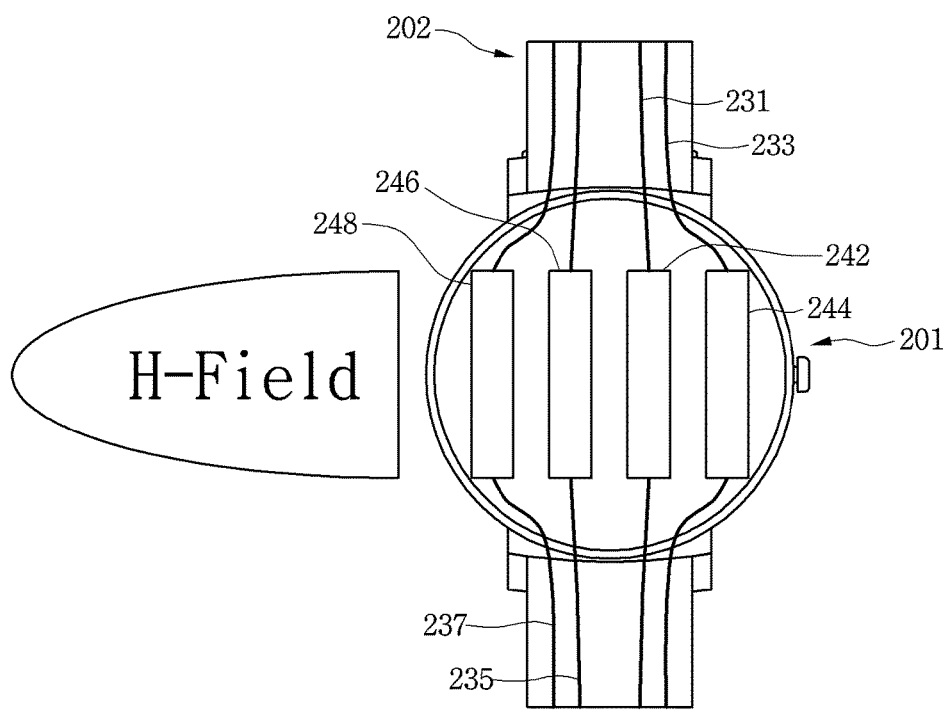
FIG. 8a is a diagram showing a state in which an H-Field progresses to the left side of a watch-type mobile terminal according to change in layout structure of an antenna.

FIG. 8a is a diagram showing a state in which an H-Field progresses in different directions of a watch-type mobile terminal according to change in layout structure of an antenna.

As shown in FIG. 8a, the watch-type mobile terminal 100 may include a feeding antenna 231, a reflecting antenna 233 and first and second directional antennas 235 and 237.

Parts of the feeding antenna 231, the reflecting antenna 233 and the first and second directional antennas 235 and 237 may be arranged along the circumference of the band 202 and the other parts of the reflecting antenna 233 and the first and second directional antennas 235 and 237 may be disposed in the main body 201.

The capacitors 242, 244, 246 and 248 respectively provided in the feeding antenna 231, the reflecting antenna 233 and the first and second directional antennas 235 and 237 may be provided in the main body 201. Specifically, the capacitors 242, 244, 246 and 248 respectively provided in the feeding antenna 231, the reflecting antenna 233 and the first and second directional antennas 235 and 237 may be installed on a circuit board, on which a plurality of electronic devices or electronic parts is installed, without being limited thereto.

If the first and second directional antennas 235 and 237 are provided at the left side of the feeding antenna 231 and the reflecting antenna 233 is provided at the right side of the feeding antenna 231, the H-field generated by power supplied to the feeding antenna 231 may be reflected by the reflecting antenna 233 disposed at the right side of the feeding antenna 231 to progress in the left direction and may be guided by the first and second directional antennas 235 and 237, thereby progressing in the left direction of the feeding antenna 231.

Figure 8B:
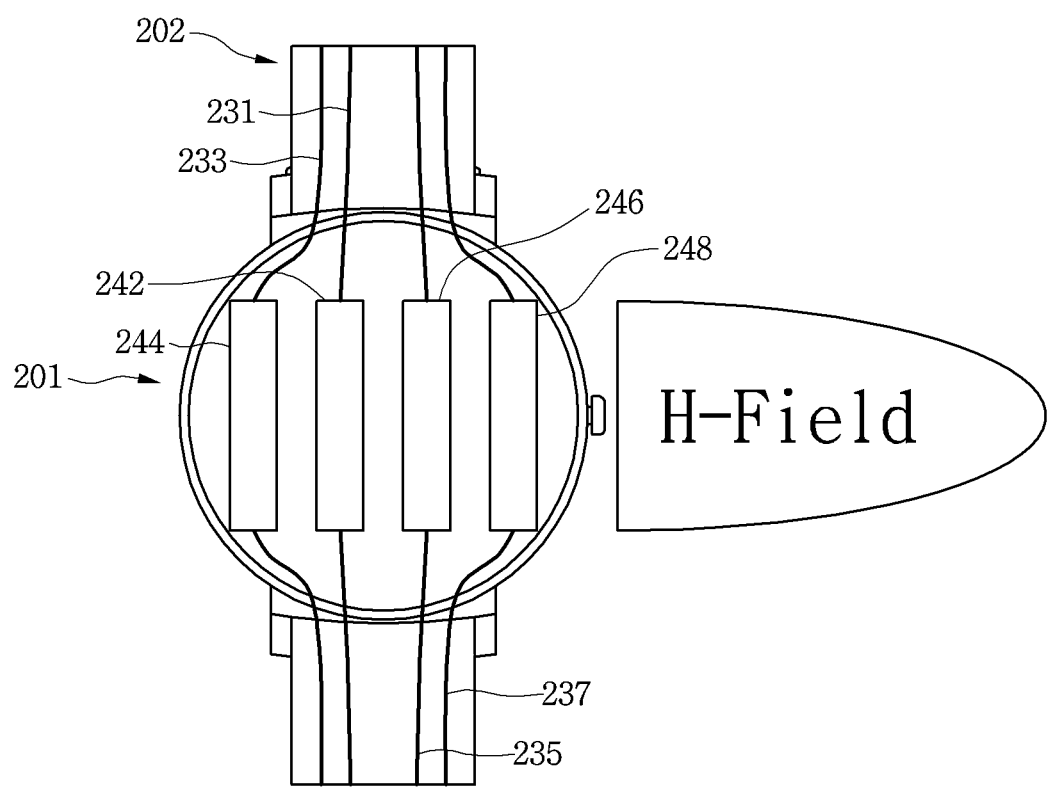
FIG. 8b is a diagram showing a state in which an H-Field progresses to the right side of a watch-type mobile terminal according to change in layout structure of an antenna.

Alternatively, as shown in FIG. 8b, if the first and second directional antennas 235 and 237 are provided at the right side of the feeding antenna 231 and the reflecting antenna 233 is provided at the left side of the feeding antenna 231, the H-field generated by power supplied to the feeding antenna 231 may be reflected by the reflecting antenna 233 disposed at the left side of the feeding antenna 231 to progress in the right direction and may be guided by the first and second directional antennas 235 and 237, thereby progressing in the right direction of the feeding antenna 231.

Accordingly, as the first and second directional antennas 235 and 237 are disposed at the left or right side of the feeding antenna 231, the H-field may progress in the left or right direction, such that a left-handed person or a right-handed person may use the watch-type mobile terminal 100 according to the present invention.

FIG. 9 is a diagram showing the structure of an antenna according to a third embodiment of the present invention.

As shown in FIG. 9, the structure of the antenna 230 according to the third embodiment of the present invention may include a first antenna 254 having a plurality of first rotation turns and a plurality of antennas 256 having a plurality of second rotation turns.

The second antennas 256 may be disposed on the first antenna 254. Specifically, the second antenna 256 may be disposed on an antenna part corresponding to a specific rotation turn of the plurality of rotation turns of the first antenna 254.

Although four second antennas are shown in FIG. 9, four or less antennas or four or more antennas may be provided.

If the plurality of second antennas 256 is provided, the plurality of second antennas 256 may have a symmetrical layout structure, without being limited thereto.

The first antenna 254 may be arranged along the circumference of the band 202 through the main body 201 of the watch-type mobile terminal 100.

The rotation direction of the first antenna 254 and the rotation direction of the second antennas 256 may be different from each other. Specifically, the rotation direction of the second antenna 256 may be perpendicular to that of the first antenna 254.

For example, if the first antenna 254 is wound on an x-y plane in a clockwise direction, the second antenna may be wound on an x-z plane or a y-z plane in a clockwise or counterclockwise direction.

The second antenna 256 may be provided in the main body 201 of the watch-type mobile terminal 100, without being limited thereto.

The first antenna 254 may be wound in a circular shape and the second antenna 256 may be wound in a rectangular or circular shape, without being limited thereto.

The size of the second antenna 256 is less than that of the first antenna 254. For example, if the first and second antennas 254 and 256 have a circular shape, the diameter of the second antenna 256 may be less than that of the first antenna 254.

The number of rotation turns of the first antenna 254 may be different from that of the second antenna 256. For example, the number of rotation turns of the second antenna 256 may be greater than that of the first antenna 254, without being limited thereto.

The numbers of turns of the plurality of second antennas 256 may be equal, without being limited thereto.

One end and the other end of the second antenna 256 may be connected to the first antenna 254.

As shown in FIG. 9, the second antenna 256 is responsible for suppressing the H-field generated by the first antenna 254 from being dispersed to the upper/lower side of the first antenna 254 to guide the H-field in the progressing direction of the first antenna 254.

By providing the plurality of antennas 256 on the first antenna 254, the directivity of the H-field may be enhanced, thereby more easily reading information on the product by the H-field.

FIGS. 10 to 13 show the fastening structure of an antenna when the band of the watch-type mobile terminal is divided into first and second bands.

The antenna 230 shown in FIGS. 10 to 13 may be one of the antennas shown in FIGS. 5, 6 and 9, without being limited thereto.

Figure 10:
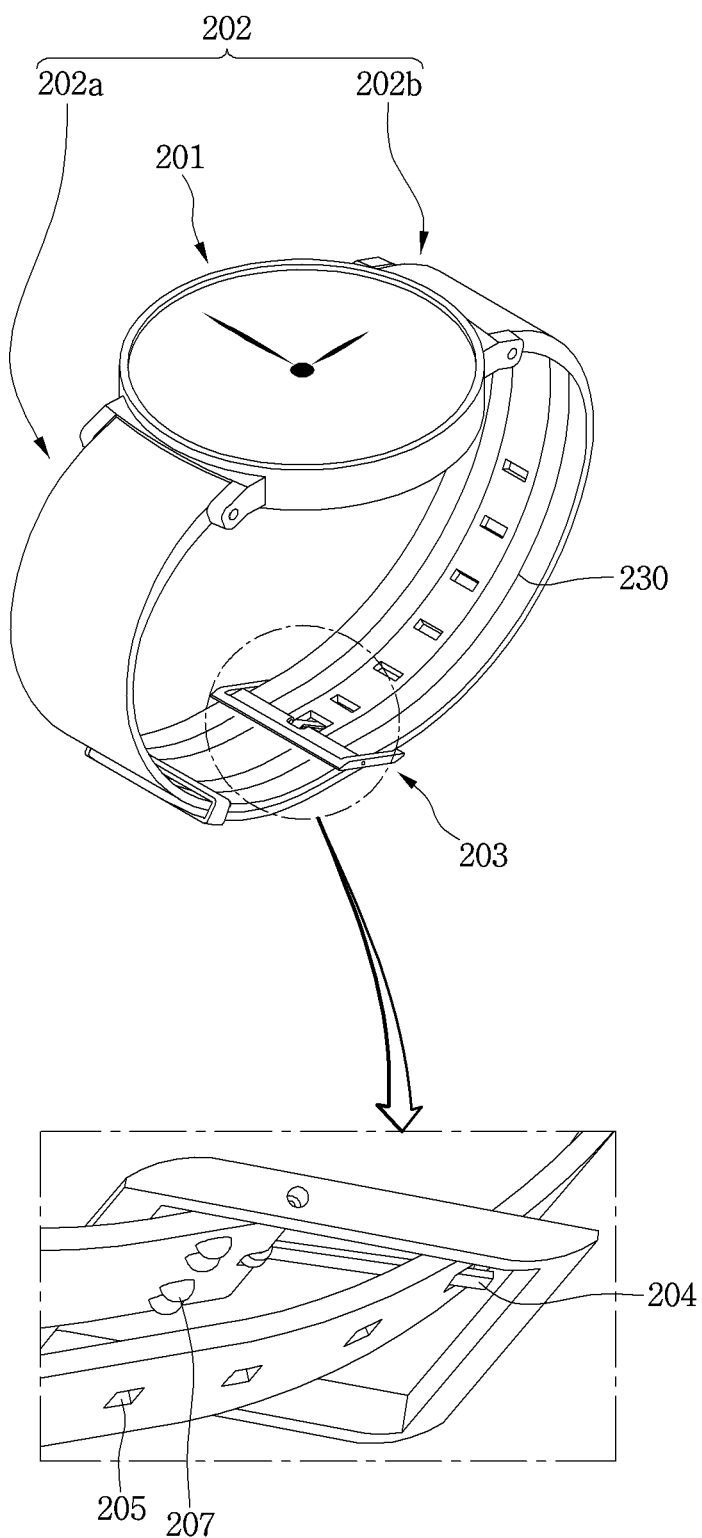
FIG. 10 is a diagram showing the fastening structure of an antenna provided in a watch-type mobile terminal according to a first embodiment of the present invention.

FIG. 10 is a diagram showing the fastening structure of an antenna provided in a watch-type mobile terminal according to a first embodiment of the present invention.

As shown in FIG. 10, the antenna 230 may be disposed in the main body 201 and band 202 of the watch-type mobile terminal 100.

The antenna 230 may be arranged along the circumference of the band 202 through the main body 202.

The antenna 230 may be disposed at an inner side surface of the band 202 to be externally exposed, without being limited thereto. Alternatively, the antenna 230 may be disposed in the band 202 not to be externally exposed.

In the structure in which the watch-type mobile terminal 100 is worn on the wrist of the user and then is fastened by a fastener 203, the band 202 may include a first band 202a and a second band 202b separated from each other with the fastener 203 interposed therebetween.

The first band 202a may be connected to one side of the main body 201 and the second band 202b may be connected to the other side of the main body 201.

The first band 202a may be connected to the second band 202b. That is, the second band 202b may be fastened to the fastener 203 provided at the end of the first band 202a.

For example, a plurality of fastening holes 205 fastened by a fastening part 204 provided in the fastener 203 may be provided in the second band 202b. The plurality of fastening holes 205 may be separated from each other in a longitudinal direction of the band 202. The size of the band 202 may be adjusted depending on to which of the fastening holes 205 the fastening part 204 of the fastener 203 is fastened.

Since the first band 202a and the second band 202b are separated by the fastener 203, the antenna 230 provided in the band 202 may be separated. In order to connect the separated antennas 230 by the fastener 203, a plurality of contact parts 207 may be provided in the fastener 203 or the band 202 adjacent to the fastener 203.

The contact part 207 may be formed of a material having electrical conductivity, for example, metal. For example, the contact part 207 may be formed of aluminum, without being limited thereto.

The plurality of contact parts 207 may be disposed at an outer side surface of the first band 202a, for example, and may be connected to the antenna 230 through the first band 202a.

Alternatively, the antenna 230 may be connected to the contact part 207 through the first band 202a.

The contact part 207 may protrude from the outer side surface of the first band 202a and have a circular shape, without being limited thereto.

When the watch-type mobile terminal 100 is worn on the wrist of the user and then the fasting part 204 of the fastener 203 is fastened to the fastening hole 205 of the second band 202b, the plurality of contact parts 207 disposed at the outer side surface of the first band 202a may brought into contact with the antenna 230 of the second band 202b, thereby configuring a closed-loop antenna structure.

In the fastening structure of the antenna 230 provided in the watch-type mobile terminal 100 according to the present invention, although the antenna 230 is separated by the fastener 203, since the separated antennas 230 are connected through the contact part 207, an NFC signal capable of reading product information may be easily generated although the antenna 230 is arranged along the circumference of the band 202 of the watch-type mobile terminal 100.

Figure 11:
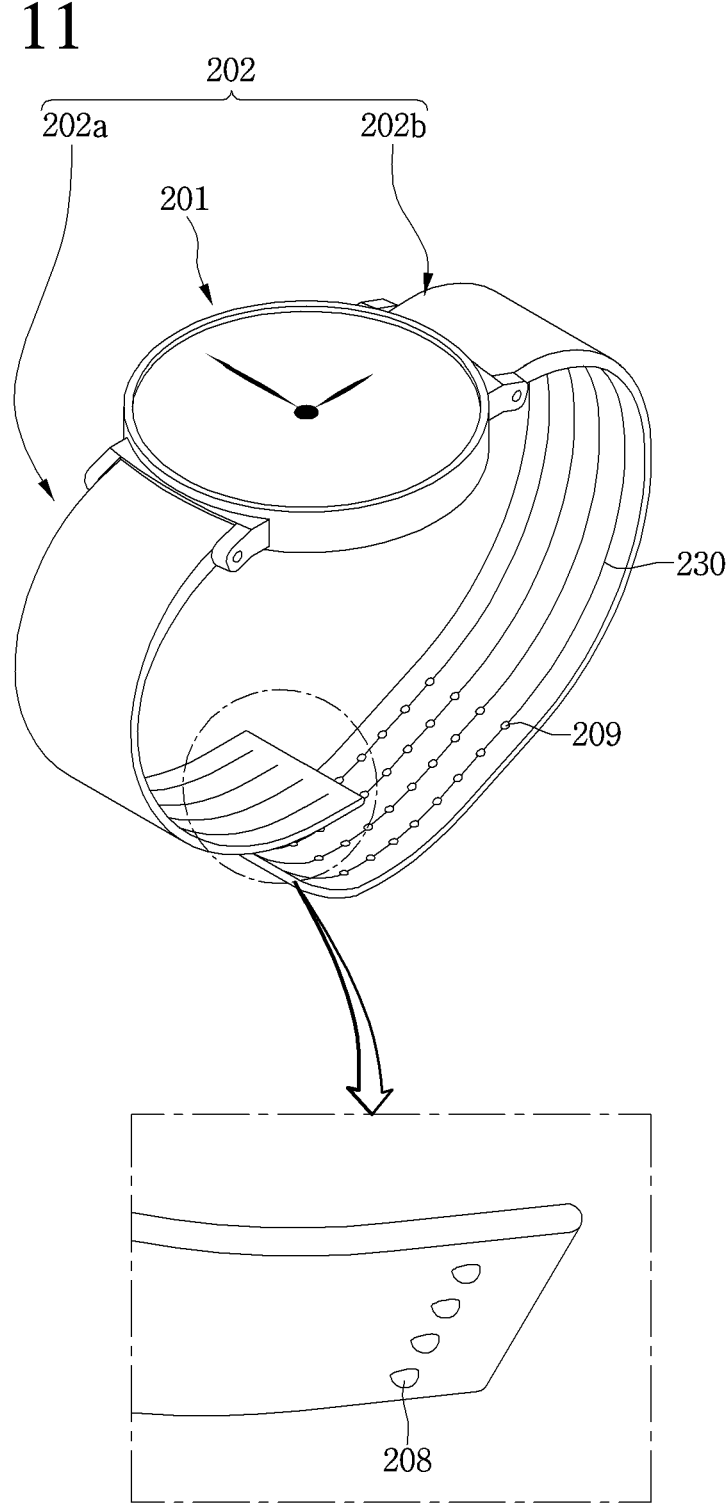
FIG. 11 is a diagram showing the fastening structure of an antenna provided in a watch-type mobile terminal according to a second embodiment of the present invention.

FIG. 11 is a diagram showing the fastening structure of an antenna provided in a watch-type mobile terminal according to a second embodiment of the present invention.

The fastening structure of the antenna 230 provided in the watch-type mobile terminal 100 according to the second embodiment is equal to that of the first embodiment except for the first and second magnet fixing parts 207 and 209.

As shown in FIG. 11, the antenna 230 having a plurality of windings may be disposed in the main body 201 and the band 202.

The band 202 may include first and second bands 202a and 202b separated from each other.

When the first and second bands 202a and 202b are fastened, a plurality of first and second magnet fixing parts 207 and 209 may be disposed in order to connect the antennas 230 disposed in the first and second bands 202a and 202b.

For example, the first magnet fixing parts 208 may be disposed on an end of the first band 202a or the outer side surface of a region adjacent to the end and the second magnet fixing parts 209 may be disposed on the inner side surface of the second band 202b.

Alternatively, the first magnet fixing parts 208 may be disposed on the first band 202a and the second magnet fixing parts 209 may be disposed on the second band 202b.

The first magnet fixing parts 208 may be connected to the antenna 230 disposed on the inner side surface of the first band 202a through the first band 202a.

Alternatively, the first magnet fixing parts 208 may be disposed on the outer side surface of the first band 202a and the antenna 230 disposed on the inner side surface of the first band 202a may be connected to the first magnet fixing parts 208 through the first band 202a.

The number of first magnet fixing parts 208 or the number of the second magnet fixing parts 209 may correspond to the number of antennas 230 or the number of rotation turns of the antenna 230.

The second magnet fixing parts 209 may be disposed at a predetermined interval in the longitudinal direction of the second band 202b.

The antenna 230 disposed in the second band 202b may be disposed in the inner side surface of the second band 202b. In this case, the antenna 230 disposed in the second band 202b may be connected to the second magnet fixing part 209 disposed at a predetermined interval. Accordingly, the antenna 230 may be disposed between the second magnet fixing parts 209.

The first and second magnet fixing parts 207 and 209 may be formed of a magnetic material having electrical conductivity.

The first and second magnet fixing parts 207 and 209 may have opposite polarities. For example, the first magnet fixing parts 208 have a P-type polarity and the second magnet fixing part 209 have an N-type polarity, without being limited thereto.

The first magnet fixing parts 208 may have a convex shape and the second magnet fixing part 209 may have a concave shape. Accordingly, when the first band 202a and the second band 202b are fastened, since the first magnet fixing part 208 may be inserted into the second magnet fixing part 209 having the concave shape and the first magnet fixing part 208 is attached to the second magnet fixing part 209 by attractive force, fixedness between the first magnet fixing parts 208 and the second magnet fixing parts 209 may be enhanced.

Accordingly, when the watch-type mobile terminal 100 is worn on the wrist of the user and then the first magnet fixing parts 208 provided in the first band 202a is located near the second magnet fixing parts 209 of the second band 202b, the first magnet fixing parts 208 of the first band 202a may be brought into contact with and fixed to the second magnet fixing parts 209 of the second band 202b by attractive force between the first magnet fixing parts 208 and the second fixing parts 209.

According to the fastening structure of the antenna provided in the watch-type mobile terminal according to the second embodiment of the present invention, the first and second magnet fixing parts 209 are responsible for fastening the first band 202a and the second band 202b and connecting the antennas 230 of the first band 202a with the antenna of the second band 202b.

Figure 12:
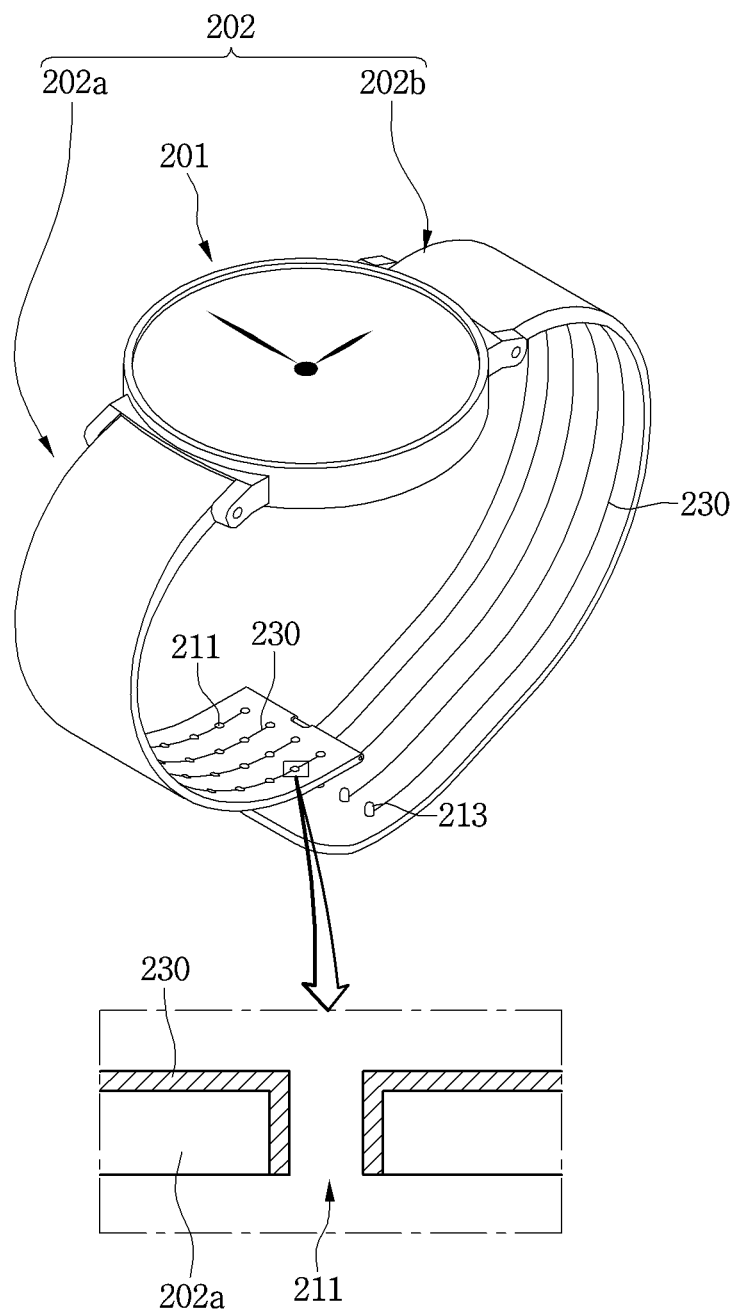
FIG. 12 is a diagram showing the fastening structure of an antenna provided in a watch-type mobile terminal according to a third embodiment of the present invention.

FIG. 12 is a diagram showing the fastening structure of an antenna provided in a watch-type mobile terminal according to a third embodiment of the present invention.

The fastening structure of the antenna 230 provided in the watch-type mobile terminal 100 according to the third embodiment is equal to that of the first embodiment except for a fastening hole 211 and a fastening part 213.

As shown in FIG. 12, the antenna 230 may be disposed on the inner side surfaces of the first and second bands 202a and 202b.

A plurality of fastening holes 211 may be disposed in the first band 202a at a predetermined interval in the longitudinal direction of the first band 202a. The antenna 230 may be disposed not only in the inner side surface of the first band 202a but also in the inner side surface of the fastening hole 211.

The plurality of fastening parts 231 may be disposed on the antenna 230 disposed in the inner side surface of the second band 202b or an end of the antenna 230.

Alternatively, the fastening parts may be disposed on the first band 202a and the fastening holes 211 may be disposed in the second band 202b.

The fastening parts 213 may be formed of a material having electrical conductivity, for example, metal. For example, the fastening parts 213 may be formed of aluminum, without being limited thereto.

The fastening part 213 may protrude from the inner side surface of the second band 202b upward and have a circular shape, without being limited thereto.

The height of the fastening part 213 may be equal to or greater or less than the depth of the fastening hole, that is, a sum of the thickness of the first band 202a.

When the watch-type mobile terminal 100 is worn on the wrist of the user, the fastening parts 213 of the second band 202b may be inserted into and fixed to the fastening holes 211 of the first band 202a.

When the fastening parts 213 are inserted into the fastening holes 211, the fastening parts 213 may be brought into contact with the antenna 230 disposed in the inner side surfaces of the fastening holes 211. Accordingly, the antenna 230 disposed in the second band 202b may be connected to the antenna 230 disposed in the first band 202a through the fastening holes 211 of the first band 202a and the fastening parts 213 of the second band 202b.

According to the fastening structure of the antenna provided in the watch-type mobile terminal according to the third embodiment of the present invention, the fastening parts 213 and the fastening holes 211 are responsible for fastening the first band 202a and the second band 202b and connecting the antennas 230 of the first band 202a with the antenna of the second band 202b.

Figure 13:
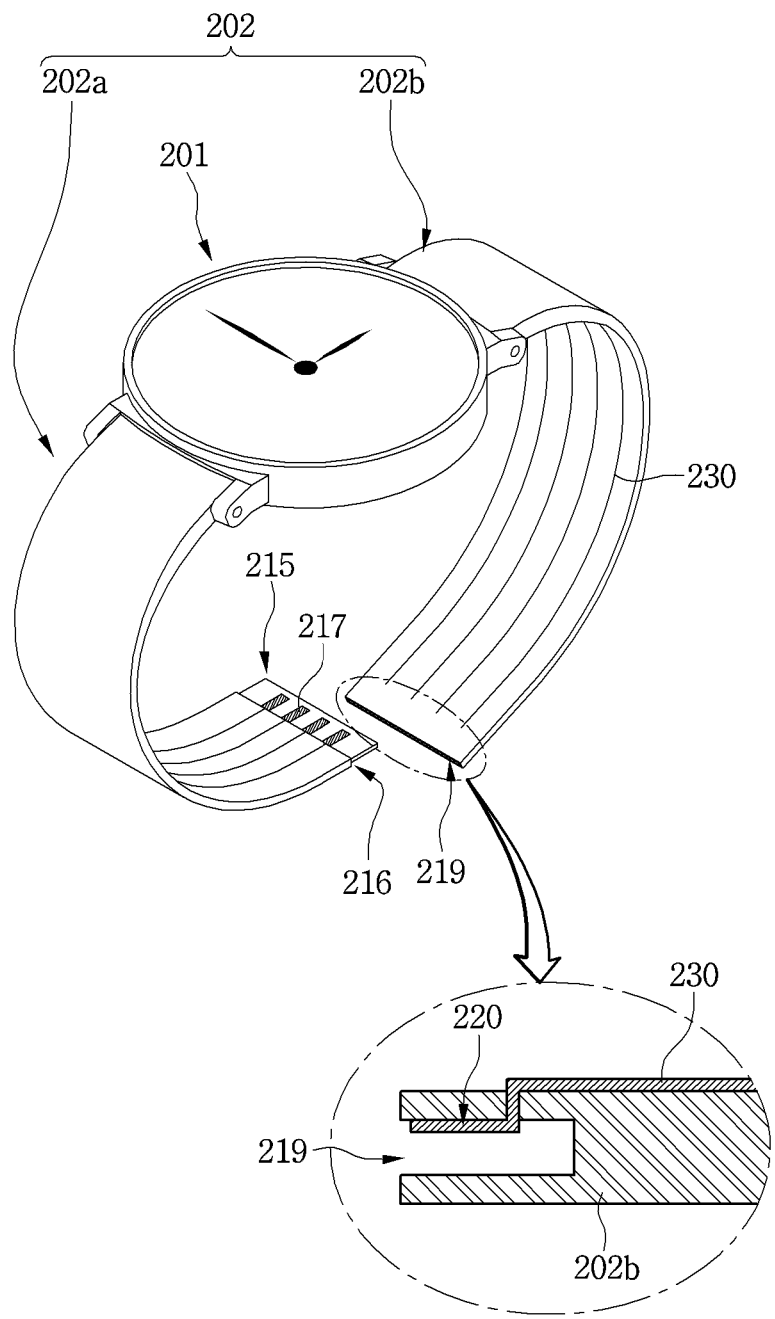
FIG. 13 is a diagram showing the fastening structure of an antenna provided in a watch-type mobile terminal according to a fourth embodiment of the present invention.

FIG. 13 is a diagram showing the fastening structure of an antenna provided in a watch-type mobile terminal according to a fourth embodiment of the present invention.

The fastening structure of the antenna 230 provided in the watch-type mobile terminal 100 according to the fourth embodiment is equal to the first embodiment except for a protrusion 215 and a reception hole 219.

As shown in FIG. 13, the antenna 230 having a plurality of rotation turns may be disposed on the inner side surfaces of the first and second bands 202a and 202b.

The protrusion 215 protruding in the longitudinal direction of the first band 202a may be provided at an end of the first band 202a. The thickness of the protrusion 215 may be less than that of the first band 202a. Therefore, since the thickness of the protrusion is less than that of the first band 202a, a locking part may be disposed on the protrusion 215.

Conductive pads 217 may be disposed on the protrusion 215. The conductive pads 217 may be connected to the antenna 230 disposed on the inner side surface of the first band 202a. The conductive pads 217 may be formed of the same material as or a material different from the antenna 230 disposed on the inner side surface of the first band 202a, without being limited thereto.

The width of the conductive pad 217 may be greater than that of the antenna 230, without being limited thereto.

The ends of the conductive pads 217 may be spaced apart from the end of the protrusion 215 inward such that foreign materials may be attached thereto.

Since the antenna 230 provided in the first band 202a and the conductive pads 217 are connected in one-to-one correspondence, the conductive pads 217 corresponding in number to the number of rotation turns may be provided.

The reception hole 219 may be provided in the end of the second band 202b. Extensions 220 extending from the antenna 230 disposed in the reception hole 219 of the second band 202b may be provided. The extensions 220 may be formed of the same material as or a material different from the antenna 230, without being limited thereto.

Since the antenna 230 provided in the second band 202b and the extensions 220 are connected in one-to-one correspondence, extensions 220 corresponding in number to the number of rotation turns of the antenna 230 may be provided.

The extensions 220 may be extended from the antenna 230 disposed on the inner side surface of the second band 202b and may be disposed on the inner side surface of the upper side of the reception hole 219 through the second band 202b. Accordingly, when the protrusion 215 is received in the reception hole 219, the conductive pads 217 provided in the protrusion 215 and the extensions 220 provided in the reception hole 219 are disposed to face each other and the conductive pads 217 and the extensions 220 may be fixed to surface-contact each other.

In order to prevent the protrusion 215 from being unlimitedly inserted into the reception hole 219, a locking part 216 may be provided on the protrusion 215. When the protrusion 215 is inserted into the reception hole 219, the side surface of the end of the second band 202b is locked by the locking part 216 provided on the protrusion 215 such that the protrusion 215 is no longer inserted into the reception hole 219.

Although the antenna 230 disposed on the inner side surface of the band 202 is externally exposed in the above-described antenna of the present invention, a protective film formed of an insulating material may be disposed on the antenna 230 so as not to externally expose the antenna 230, without being limited thereto.

In the watch-type mobile terminal 100 having the structure of the above-described antenna 230, by arranging the antenna 230 along the circumference of the band 202, it is possible to more easily detect information included in the tag sticker of a product only when the product is held in the hand of the user.

In addition, in the watch-type mobile terminal 100 according to the present invention, the H-field is enhanced in a specific direction through change of the layout of the antenna 230, thereby improving readability of product information.

In addition, in the watch-type mobile terminal 100 of the present invention, if the first and second bands 202a and 202b, in which the antenna 230 having a plurality of rotation turns are disposed, are separated from each other, the antenna 230 of the first band 202a and the antenna 230 of the second band 202b may be easily connected to each other through various fastening structures of the first and second bands 202a and 202b.

In addition, the watch-type mobile terminal 100 of the present invention acquires product information of products, adds the products to a shopping cart list and pays for the products added to the shopping cart list at a time. Therefore, since the user only pays for the products, the user does not need to put products to be purchased into a cart in a store. In addition, since payment is made at a time, payment is convenient.

Hereinafter, embodiments related to a method of controlling the watch-type mobile terminal 100 having the above-described configuration will be described with reference to the accompanying drawings. It is apparent to those skilled in the art that the present invention is variously embodied without departing from the spirit and scope of the present invention.

Figure 14:
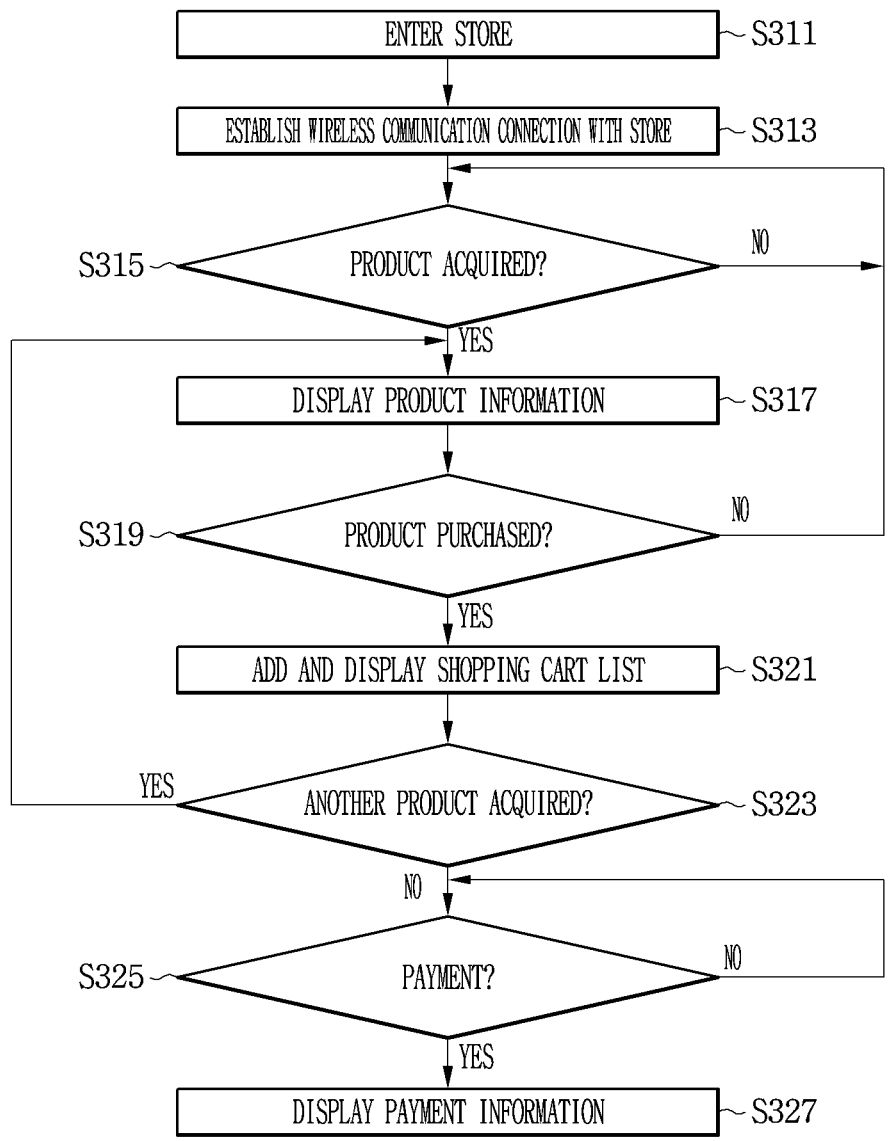
FIG. 14 is a flowchart illustrating a product purchasing method in a watch-type mobile terminal according to the present invention.

FIG. 14 is a flowchart illustrating a product purchasing method in a watch-type mobile terminal according to the present invention.

Referring to FIG. 14, when a user who wears the watch-type mobile terminal 100 enters a store (S311), wireless communication connection may be established such that wireless communication between the store and the watch-type mobile terminal 100 is possible (S313).

The watch-type mobile terminal 100 may include the short-range communication module 114 and the store may include a short-range communication module 114. Accordingly, when the user who wears the watch-type mobile terminal 100 enters the store, the short-range communication module provided in the store may establish wireless communication connection with the short-range communication module 114 of the watch-type mobile terminal 100 and transmit information on the store to the watch-type mobile terminal 100 when wireless communication connection succeeds.

The information on the store may include the name, size and position of the store, product information, product prices and places where products are produced.

When wireless communication connection with the watch-type mobile terminal 100 succeeds, the store sets a database provided in the store to be accessed by the watch-type mobile terminal 100. Accordingly, the watch-type mobile terminal 100 may access the database of the store and search for product information, thereby acquiring desired product information. Acquisition of product information through product search is different from acquisition of product information through execution of a product purchasing application described below or setting of a shopping cart mode. That is, when wireless communication connection of the watch-type mobile terminal 100 with the store is established, the watch-type mobile terminal 100 may search for products requested by the user according to the request of the user, thereby acquiring product information related to the searched products.

When wireless communication connection with the store succeeds, the watch-type mobile terminal 100 may execute a product purchasing application for product purchase.

Alternatively, when wireless communication connection with the store succeeds, the watch-type mobile terminal may set a shopping cart mode in the store. By setting the shopping cart mode, it is possible to detect and purchase products in the store.

When a product is held in the hand of the user entering the store (S315), the control unit 180 of the watch-type mobile terminal 100 may acquire and display the product information on the touchscreen 151 (S317). The product information may be included in the tag sticker adhered to the product and the watch-type mobile terminal 100 may acquire the product information included in the tag sticker of the product.

When the user inputs a product purchasing request (S319), the control unit 180 may add the product to the shopping cart list and display the shopping cart list, to which the product is added, on the touchscreen 151 (S321).

When another product is held in the hand of the user (S323), the method may progress to step S315 and steps S317 to S321 are sequentially performed.

When the user no longer adds a product to the shopping cart list and the user inputs a payment request (S325), payment may be made. For example, payment may be made at a counter of the store. Information on payment made at the counter of the store may be transmitted to the watch-type mobile terminal 100.

The control unit 180 may display the information on payment on the touchscreen 151 (S327).

According to the present invention, since payment is made after the user acquires product information from products displayed in the store in real time and determines whether the product is purchased or not based on the acquired product information, the user may not carry a cart, into which products to be purchased are put.

Various product purchasing methods using the watch-type mobile terminal 100 having the antenna layout structure according to the present invention will be described with reference to FIGS. 15 to 23.

Figure 15:
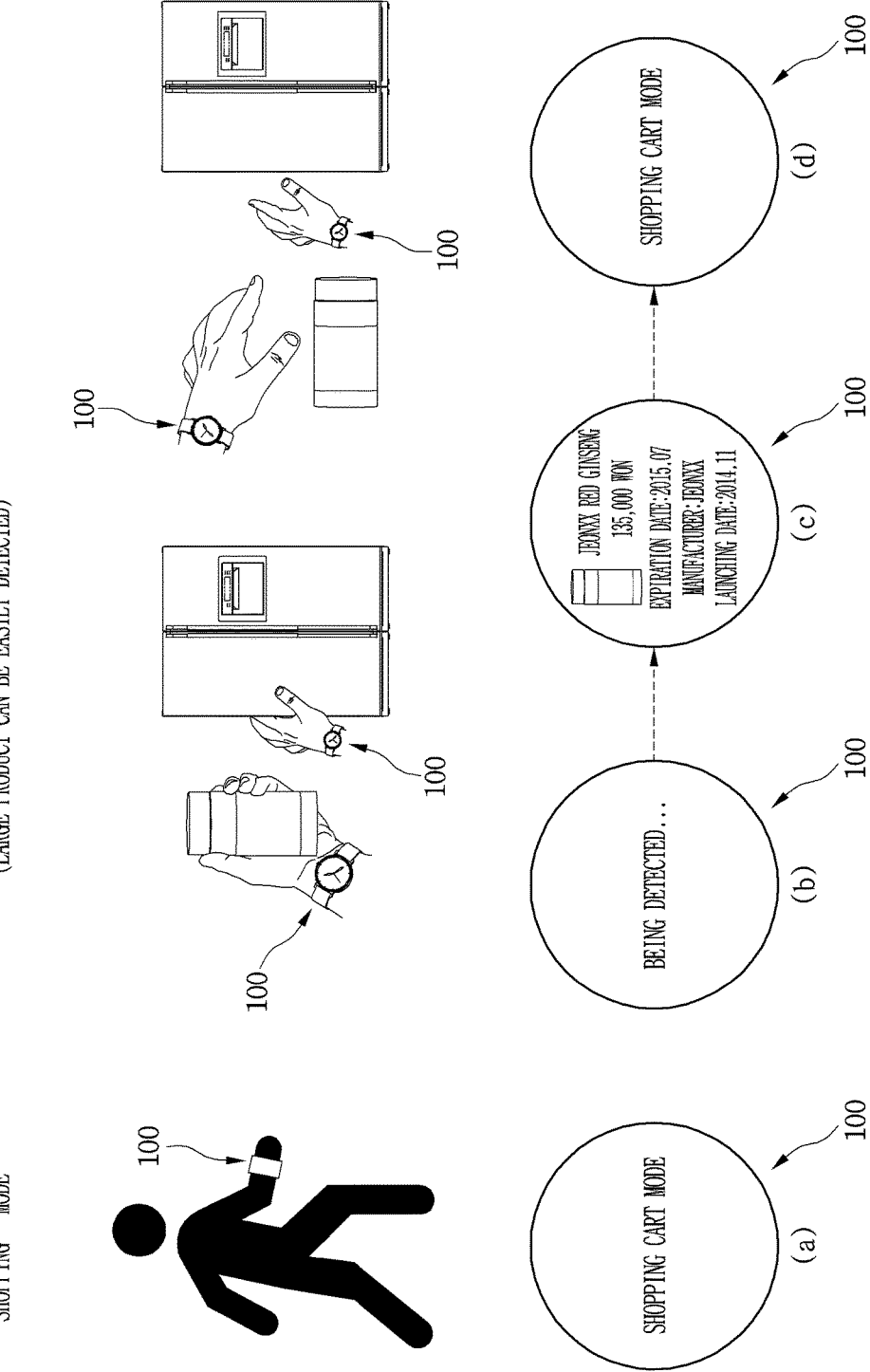
FIG. 15 is a diagram showing an example of a screen for displaying a state of acquiring product information.

FIG. 15 is a diagram showing an example of a screen for displaying a state of acquiring product information.

As shown in FIG. 15a, when a user enters a store, wireless communication connection of the watch-type mobile terminal 100 worn on the wrist of the user with the store may be established to set the shopping cart mode in the watch-type mobile terminal 100. By setting the shopping cart mode, it is possible to purchase products in the store.

If the shopping cart mode is set, a message "shopping cart mode" may be displayed on the touchscreen 151 of the watch-type mobile terminal 100. The user may confirm that wireless communication connection between the watch-type mobile terminal 100 and the store is normally established through the message "shopping cart mode" displayed on the touchscreen 151.

As shown in FIG. 15b, when the user enters the store and holds or touches a specific product, the EMG sensor 141 provided in the watch-type mobile terminal 100 may operate to change the muscles of the wrist of the user by a user's action of holding or touching a specific product. The EMG sensor 141 may detect change in muscles of the wrist as an electrical signal, for example, an EMG signal, and the control unit 180 may determine that the user holds or touches a specific product based on the EMG signal detected by the EMG sensor 141 and activate the NFC module including the antenna 230 shown in FIGS. 5, 6 and 9 to generate an NFC signal. Accordingly, the NFC module may not be usually activated and may be activated to generate an NFC signal only when the user holds or touches a specific product.

As shown in FIG. 15c, the product information may be detected by the NFC signal. At this time, a message "being detected" may be displayed on the touchscreen 151.

A specific product having a small size may be held in the hand of the user and a specific product having a large size, such as a refrigerator, may not be held in the hand of the user and thus may be touched.

According to the present invention, the muscle of the wrist is changed by an action of holding or touching the product and a user interface (UI) or user experience corresponding to change in muscle of the wrist may be implemented.

By such an NFC signal, the product information included in the tag sticker of the specific product may be acquired. The control unit 180 may display the acquired product information on the touchscreen 151.

For example, when the user holds a product "red ginseng", the product information of the "red ginseng" may be displayed on the touchscreen 151 of the watch-type mobile terminal 100.

Meanwhile, when the user's hand is separated from the product held therein or when the user goes away from the product touched by the user, the muscle of the wrist is relaxed by movement of the fingers of the user. In other words, when pressure applied to the fingers of the user is released, as shown in FIG. 15d, the product information displayed on the touchscreen 151 may disappear and the shopping cart mode may be performed again such that the message "shopping cart mode" is displayed on the touchscreen 151.

Figure 16:
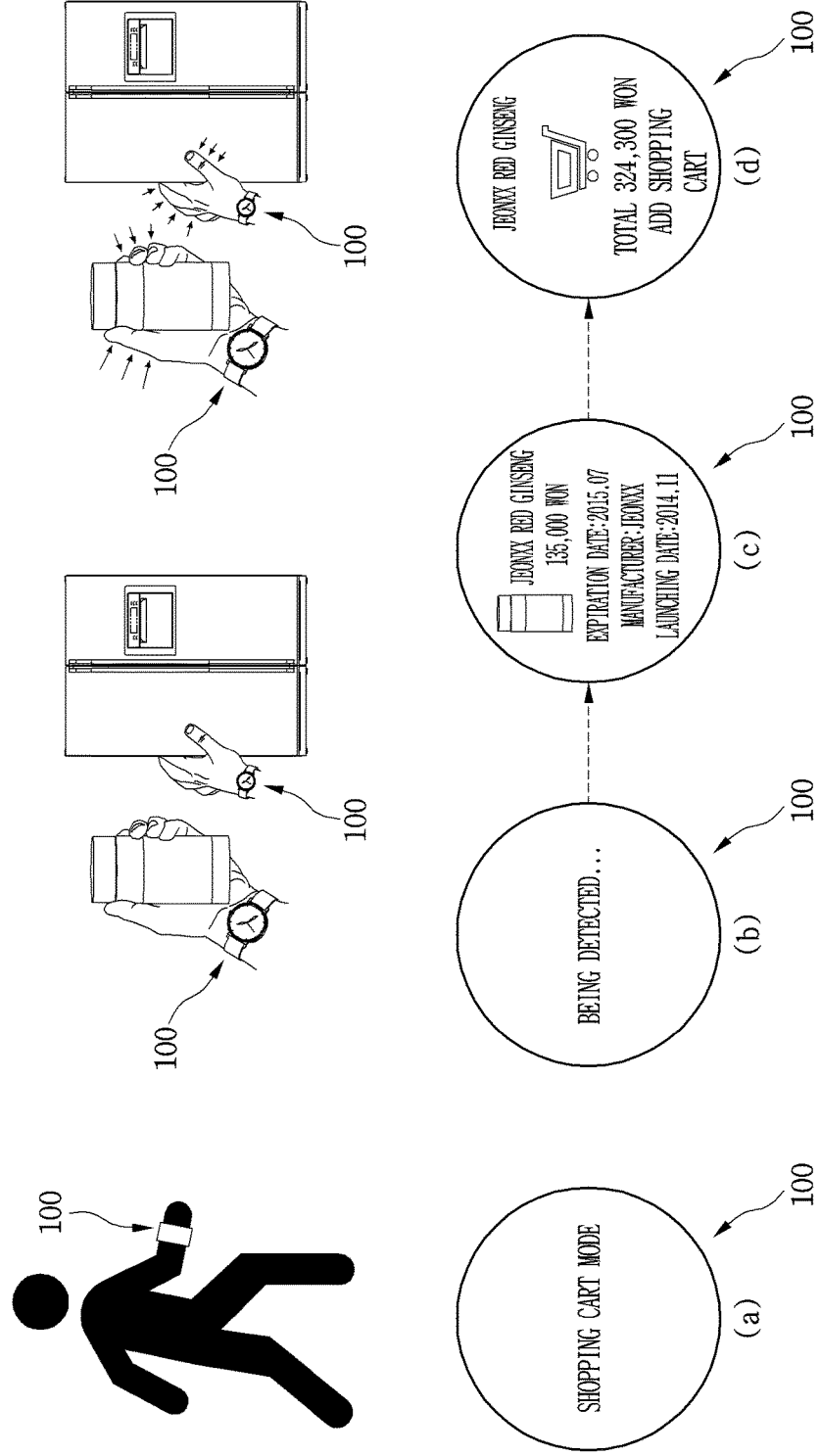
FIG. 16 is a diagram showing an example of a screen for displaying a state of adding product information to a shopping cart list.

FIG. 16 is a diagram showing an example of a screen for displaying a state of adding product information to a shopping cart list.

FIGS. 16a to 16c are equal to FIGS. 15a to 15c described above and thus a detailed description thereof will be omitted.

As shown in FIG. 16a, when the user enters a store, the watch-type mobile terminal 100 may be set to a shopping cart mode.

As shown in FIG. 16b, when the user holds or touches a product, an NFC signal may be delivered to the product and product information may be acquired in response to the NFC signal. As shown in FIG. 16c, such product information may be displayed on the touchscreen 151.

As shown in FIG. 16d, when the user desires to purchase the product, pressure applied to the product held or touched by the user may be further increased to add the product related to the product information displayed on the touchscreen 151 to the shopping cart list.

Increasing of pressure applied to the product may be sensed by the EMG sensor 141.

Specifically, when pressure applied to the product by the user is increased, change in muscle of the wrist worn on the watch-type mobile terminal 100 is further increased and thus change in EMG signal of the EMG sensor 141 is further increased. The control unit 180 may recognize that the user desires to purchase the product based on change in EMG signal and add the product related to the product information displayed on the touchscreen 151 to the shopping cart list.

The product added to the shopping cart list may be displayed on the touchscreen 151.

Figure 17:
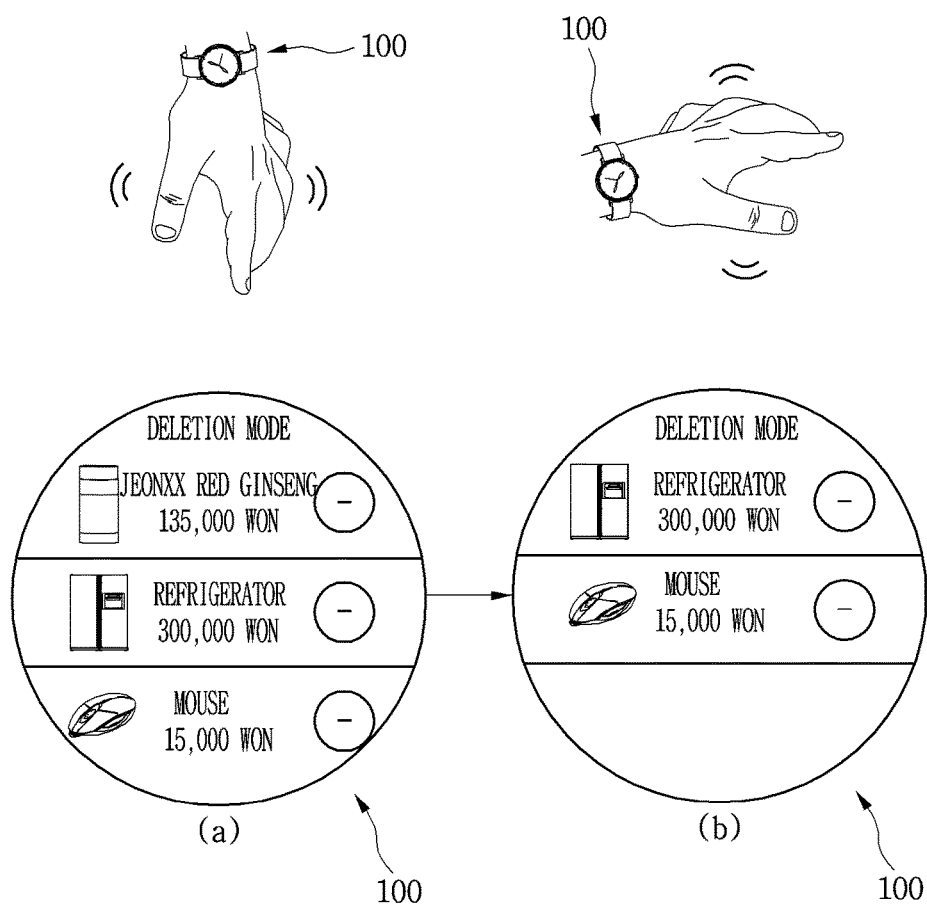
FIG. 17 is a diagram showing an example of a screen for displaying a state of deleting a product added to a shopping cart.

FIG. 17 is a diagram showing an example of a screen for displaying a state of deleting a product added to a shopping cart.

As shown in FIG. 17a, when the user's hand faces downwards and, at the same time, the user inputs a hand shaking gesture, a plurality of products added to the shopping cart list may be displayed on the touchscreen 151.

In order to display the plurality of products added to the shopping cart list, various gestures other than the above-described gesture may be used.

The direction of the user's hand and the hand shaking gesture may be sensed by the acceleration sensor 141 and the gyroscope sensor 143.

As shown in FIG. 17b, when the user inputs the hand shaking gesture while maintaining the user's wrist in a horizontal direction, one of the plurality of products included in the shopping cart list may be deleted.

Whenever the hand shaking gesture is input, the products may be deleted one by one. For example, whenever the hand shaking gesture is input, the plurality of products added to the shopping cart list may be deleted one by one, starting from the product disposed at the top thereof.

Assume that Product A, Product B and product C are sequentially included in the shopping cart list from the top thereof and Product A is "Jeong Gwan Jang red ginseng", Product B is "honey butter chips" and Product C is "humidifier". In this case, Product A included in the shopping cart list may be deleted when the hand shaking gesture is input once, Product B may be deleted when the hand shaking gesture is input twice and Product C may be deleted when the hand shaking gesture is input one more time.

In order to delete the product, various gestures other than the above-described gesture may be used.

Meanwhile, as shown in FIG. 17a, when a plurality of products included in the shopping cart list is displayed, the product may be deleted through direct selection of the user. That is, when the user inputs a command for selecting any one of the plurality of products included in the shopping cart list, the selected product may be immediately deleted. Alternatively, the product may not be immediately deleted and a message asking about deletion of the product may be displayed and the product may be deleted from the shopping cart list when a deletion command is received.

Figure 18:
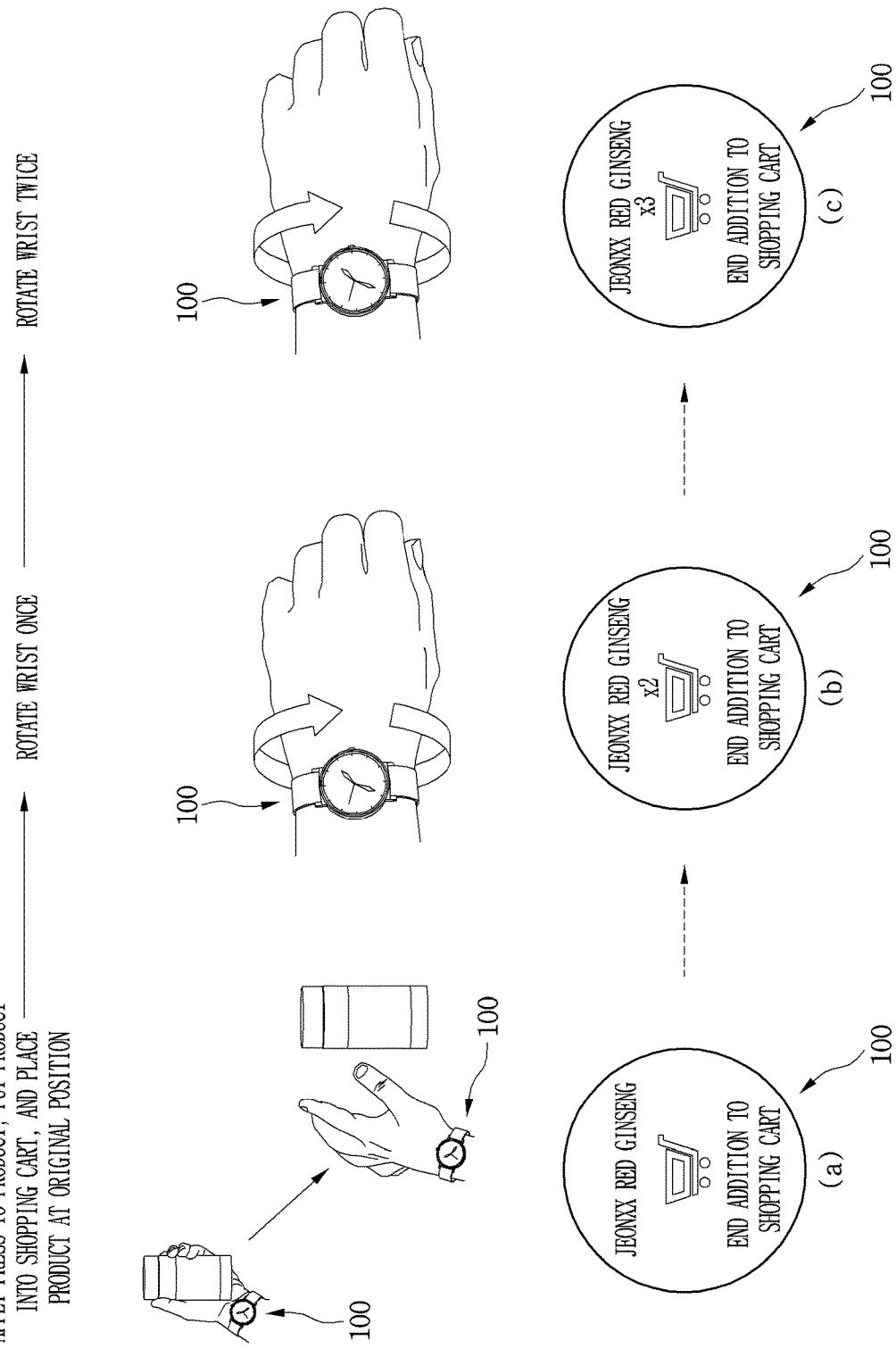
FIG. 18 is a diagram showing an example of a screen for displaying a state of adding the same product to a shopping cart list multiple times.

FIG. 18 is a diagram showing an example of a screen for displaying a state of adding the same product to a shopping cart list multiple times.

When a specific product is added to the shopping cart list, multiple specific products may be purchased. In this case, it is troublesome to repeat a process of displaying the product information through the gesture of holding or touching the specific product and adding the product to the shopping cart list through the gesture of further applying pressure.

The present invention proposes a method of inputting a gesture of holding or touching a specific product only once and adding a predetermined number of products desired by the user to the shopping cart using another gesture.

As shown in FIG. 18a, when the specific product is currently added to the shopping cart list, the product held in the user's hand may be placed at an original position thereof.

Thereafter, when the user inputs a gesture of rotating the wrist once in a specific rotation direction, for example, in a clockwise direction while clenching a user's fist, as shown in FIG. 18b, one more specific product is added to the shopping cart list. Accordingly, two specific products may be included in the shopping cart list.

Subsequently, when the user inputs the gesture of rotating the wrist once in the clockwise direction while clenching the user's fist, as shown in FIG. 18c, one more specific product may be added to the shopping cart list. Accordingly, three specific products may be included in the shopping cart list.

Whenever the gesture of rotating the wrist in the specific direction is input, the specific product may be added to the shopping cart list one by one.

Meanwhile, it may be troublesome for the user to increase the number of same products to be purchased. For example, when the number of same products to be purchased by the user is 30, the gesture of rotating the wrist in the clockwise direction while clenching the user's fist is made 30 times. Therefore, considerable time and considerable efforts of the user are required to make the above-described gesture.

FIG. 19 is a diagram showing an example of a screen for explaining a method of minimizing the number of gestures of a user even when a large number of same products is added to a shopping cart list.

FIG. 19 is a diagram showing an example of a screen for displaying a state of adding the same product to a shopping cart list multiple times.

When one product purchased by the user is currently added to the shopping cart list, as shown in FIG. 19a, when the user inputs the gesture of continuously rotating the hand twice in a first rotation direction, for example, in a clockwise direction, or shaking the hand while clenching user's fist, 10 products may be added to the shopping cart list. Accordingly, 11 products may be included in the shopping cart list.

As described above, whenever the user inputs the gesture of continuously shaking the hand twice in the clockwise direction while clenching the user's fist, 10 products may be added to the shopping cart list.

As shown in FIG. 19b, when the user inputs the gesture of rotating or shaking the hand once in a second rotation direction, that is, in a counterclockwise direction, while clenching the user's fist, one product may be added to the shopping cart list.

The number of products added to the shopping cart list may be set through various gestures.

For example, whenever the gesture of shaking the hand once in the clockwise direction while clenching the user's fist, 5 same products may be added to the shopping cart list.

For example, whenever the user inputs a gesture of pushing the user's fist forward and then pulling the user's fist, the number of same products added to the shopping cart list may be decremented by 1. For example, if five products are included in the shopping cart list, whenever the user inputs the gesture of pushing the user's fist forward and then pulling the user's fist, one of the five products included in the shopping cart list may be deleted and four products may be included in the shopping cart list.

Figure 20:
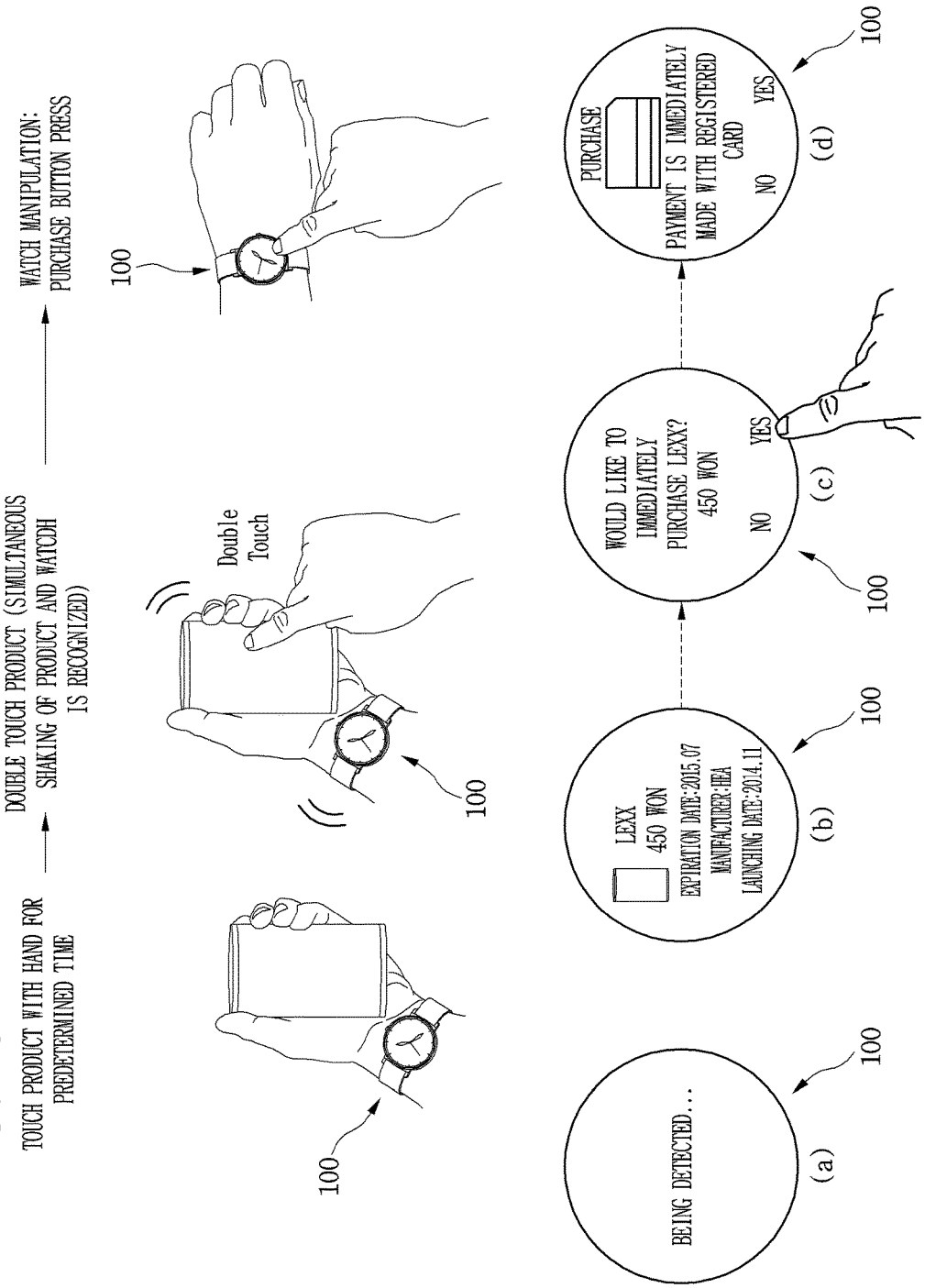
FIG. 20 is a diagram showing an example of a screen for showing a method of immediately paying for a product to be purchased without adding the product to a shopping cart list.

FIG. 20 is a diagram showing an example of a screen for showing a method of immediately paying for a product to be purchased without adding the product to a shopping cart list.

When the user holds or touches a product, as shown in FIG. 20a, a message "being searched" may be displayed on the touchscreen 151.

When the user holds or touches the product, the EMG sensor 141 may sense that the user holds or touches the product and the control unit 180 may generate and transmit an NFC signal to the product in order to read information on the product held in the user based on the sensed result.

By the NFC signal, the product information included in the tag sticker of the product may be acquired. The control unit 180 may display the acquired product information on the touchscreen 151, as shown in FIG. 20b.

As shown in FIG. 20c, when the user inputs a gesture of double touching the product, the control unit 180 may display a message for asking about purchase of the product on the touchscreen 151.

For example, a gesture of double touching the product with a finger of a right hand while the product is held in a left hand on which the watch-type mobile terminal 100 is worn may be input.

Alternatively, a gesture of double touching the product with a finger of a left hand while the product is held in a left hand on which the watch-type mobile terminal 100 is worn may be input.

Vibration may be generated in the product by inputting the double touch gesture of the user and delivered to the watch-type mobile terminal 100 through the user's wrist. The watch-type mobile terminal 100 may sense the vibration and perform operation corresponding to vibration.

Specifically, when the gesture of double touching the product is input, the product may vibrate and, at the same time, the watch-type mobile terminal 100 worn on the user's wrist may vibrate. The watch-type mobile terminal 100 may sense such vibration and determine whether the user desires to purchase the product based on the sensed result.

If the user inputs a selection command for purchase, as shown in FIG. 20d, a message for payment with a pre-registered card may be displayed on the touchscreen 151.

The selection command of the user may be input by touch of a certain region of the touchscreen 151 by the user, without being limited thereto.

In this case, payment may be made with a card when the user inputs an approval command in response to the message for payment with the pre-registered card.

Alternatively, the message for payment with the pre-registered card may be displayed on the touchscreen 151 and, at the same time, payment may be made with the card.

If there is no pre-registered card, a message for registering a card to be used for payment may be displayed on the touchscreen 151 and payment for the product may be made after the card registration process, without being limited thereto.

According to the present invention, the user may immediately pay for a specific product at a place where the specific product is located when information on the specific information is displayed on the touchscreen 151, without adding a product to be purchased to the shopping cart list.

Therefore, the user does not need to go to the counter of the store in order to pay for the specific product.

FIG. 21 is a diagram showing an example of a screen for showing a state of processing payment at a counter.

The counter of the store may confirm the position of the user, transmit a message for determining whether the bill is issued or not to the watch-type mobile terminal 100 worn on the user's wrist when the user enters or approaches the counter, and, as shown in FIG. 21a, the watch-type mobile terminal 100 may change the shopping cart mode to a payment mode and display the message on the touchscreen 151.

As another example, when the user enters the counter, the counter may transmit information on entry of the user to the watch-type mobile terminal 100, and the watch-type mobile terminal 100 may display the message for determining whether the bill is issued or not on the touchscreen 151 based on the information on entry of the user.

When the user inputs a gesture of drawing a signature while clenching the user's fist, as shown in FIG. 21b, the control unit 180 of the watch-type mobile terminal 100 may display information on the bill including a barcode on the touchscreen 151.

At this time, the signature of the user may be pre-registered in the watch-type mobile terminal 100. The signature of the user may be stored as an image and the signature of the user may be authenticated by analyzing a gesture related to the signature received from the user and comparing the received signature with the pre-registered signature.

Only when the signature of the user is successfully authenticated, the information on the bill may be displayed on the touchscreen 151.

When signature authentication of the user fails, a message indicating signature authentication failure may be displayed on the touchscreen 151.

The information on the bill displayed on the touchscreen 151 may be recognized by a barcode reader of the counter, thereby paying for the product purchased by the user.

FIG. 22 is a diagram showing an example of a screen for displaying a method of switching to a shopping cart editing mode immediately before payment.

As shown in FIG. 22a, when the user inputs a gesture of drawing the signature while clenching the user's fist, the control unit 180 of the watch-type mobile terminal 100 may display information on a bill including a barcode on the touchscreen 151.

When the user desires to delete a product included in the shopping cart list or to add a new product, the user may input a gesture of double touching the touchscreen 151, on which the information on the bill is displayed. In this case, as shown in FIG. 22b, the information on the bill displayed on the touchscreen 151 may disappear and, instead, the shopping cart list may be displayed on the touchscreen 151. Thereafter, as shown in FIGS. 17 to 19, a product may be added to the shopping cart list displayed on the touchscreen 151 or the product included in the shopping cart list may be deleted.

FIG. 23 is a diagram showing an example of a screen for displaying a method of deleting a product included in a shopping cart list before payment at a store counter.

As shown in FIG. 23a, the counter of the store may confirm the position of the user and transmit a message for determining whether the bill is issued or not to the watch-type mobile terminal 100 worn on the user's wrist when the user enters or approaches the counter, and the watch-type mobile terminal 100 may display the message on the touchscreen 151.

Although the user goes to the counter of the store in order to pay for the products included in the shopping cart list, the user's mind may be changed to delete all the products currently included in the shopping cart list to delete the shopping cart list.

In this case, when the user inputs a gesture of shaking a hand, as shown in FIG. 23b, the control unit 180 may delete all the products currently included in the shopping cart list and change a payment mode to a shopping cart mode, thereby preparing for adding a product to the shopping cart list through product detection.

If the shopping cart mode is set, the product may be added to the shopping cart list by the shopping cart list addition method shown in FIG. 16.

As another example, instead of the gesture of shaking the user's hand, the products included in the shopping cart list may be deleted using another gesture.

For example, a permission icon and a cancel icon may be provided in addition to the message for determining whether the bill is issued or not, which is displayed on the touchscreen 151. The permission icon may be a "Yes" button and the cancel button may be a "No" button.

If a gesture of touching the "No" button is input, the control unit 180 may delete all the products currently included in the shopping cart list and change the payment mode to the shopping cart mode.

If a gesture of touching the "Yes" button is input, as shown in FIG. 21b, the control unit 180 of the watch-type mobile terminal 100 may display information on the bill including a barcode on the touchscreen 151.

The present invention as described earlier may be implemented as a computer readable code in a medium having a program thereon. The computer readable medium includes all kinds of storage devices storing data that may be read by a computer system. Examples of a computer readable medium are a hard disk drive (HDD), a solid state disk (SSD), a silicon disk drive (SDD), a ROM, a RAM, a CD-ROM, a magnetic tape, a floppy disk, and an optical data storage device, and it is also implemented in the form of a carrier wave (e.g., data transmission through the Internet). Also, the computer may also include a control unit 180 of a mobile terminal 100. Thus, the detailed description should not be construed as limitative in all aspects and should be considered exemplary. The scope of the prevent invention should be defined by the reasonable understanding of the following claims and all changes falling within the equivalent scope of the prevent invention are included in the scope of the prevent invention.

INDUSTRIAL APPLICABILITY

The watch-type mobile terminal according to the present invention may be used in a store in which products are displayed. The user may store products to be purchased in the watch-type mobile terminal and then pay for the products at a time, without going around in the store while carrying a cart.

What is claimed is:

1. A watch-type mobile terminal comprising:
   a touchscreen;
   a power supply unit;
   a main body;
   a band connected to the main body and configured to be worn on a user's wrist;
   an antenna having at least one turn such that a Near Field Communication (NFC) signal for acquiring product information from a product proceeds toward a user's hand, and arranged along a circumference of the band through the main body; and
   a controller configured to:
   control the power supply unit to change power applied to the antenna in order to reduce a strength of the NFC signal when a plurality of product information is acquired from a plurality of products, wherein the strength of the NFC signal is reduced such that product information of only one of the plurality of products is acquired;
   determine that an error occurs when product information is acquired from more than one of the plurality of products;
   control the power supply unit to further reduce the strength of the NFC signal when the error occurs;
   determine that no error occurs when the product information is acquired from the only one of the plurality of products that is located at the user's hand; and
   cause the touchscreen to display the acquired product information corresponding to the only one of the plurality of products.

2. The watch-type mobile terminal according to claim 1, wherein the antenna comprises:
   a first antenna;
   a second antenna facing the first antenna and disposed at one side of the first antenna; and
   a third antenna facing the first antenna, disposed at the other side of the first antenna, and adjacent to the user's hand.

3. The watch-type mobile terminal according to claim 2, wherein the first antenna is a feeding antenna for receiving power for generating the NFC signal,
   wherein the second antenna is a reflecting antenna for reflecting the NFC signal toward the third antenna, and
   wherein the third antenna is a directional antenna for guiding the NFC signal toward the user's hand.

4. The watch-type mobile terminal according to claim 2, wherein the third antenna includes at least one antenna.

5. The watch-type mobile terminal according to claim 2, wherein the antenna further comprises a capacitor disposed between one end and the other end of each of the first to third antennas.

6. The watch-type mobile terminal according to claim 5, wherein a capacitance value of the capacitor included in the third antenna is less than that of the capacitor included in the first antenna.

7. The watch-type mobile terminal according to claim 5, wherein a capacitance value of the capacitor included in the first antenna is less than that of the capacitor included in the second antenna.

8. The watch-type mobile terminal according to claim 5, wherein the capacitor is disposed in the main body.

9. The watch-type mobile terminal according to claim 2, wherein one end and the other end of the second antenna are connected to each other.

10. The watch-type mobile terminal according to claim 1, wherein the antenna comprises:
    a first antenna having a plurality of first rotation turns; and
    a second antenna having a plurality of second rotation turns and disposed on the first antenna.

11. The watch-type mobile terminal according to claim 10,
    wherein the first antenna and the second antenna have different rotation directions, and wherein the first antenna is arranged along the circumference of the band through the main body.

12. The watch-type mobile terminal according to claim 11, wherein the rotation direction of the second antenna is perpendicular to that of the first antenna.

13. The watch-type mobile terminal according to claim 12, wherein, when the first antenna is wound on an x-y plane in a first rotation direction, the second antenna is wound on an x-z plane in the first rotation direction or in a second rotation direction opposite to the first rotation direction.

14. The watch-type mobile terminal according to claim 12, wherein, when the first antenna is wound on an x-y plane in a first rotation direction, the second antenna is wound on an y-z plane in the first rotation direction or in a second rotation direction opposite to the first rotation direction.

15. The watch-type mobile terminal according to claim 10, wherein the second antenna is disposed in the main body.

16. The watch-type mobile terminal according to claim 10,
wherein the first antenna is wound in a circular shape, and
wherein the second antenna is wound in a rectangular shape.

17. The watch-type mobile terminal according to claim 10, wherein a size of the second antenna is less than that of the first antenna.

18. The watch-type mobile terminal according to claim 10, wherein the second antenna includes at least one antenna.

* * * * *